(12) United States Patent
Chang et al.

(10) Patent No.: US 9,822,028 B2
(45) Date of Patent: Nov. 21, 2017

(54) METHODS OF PROCESSING A GLASS RIBBON

(71) Applicant: Corning Incorporated, Corning, NY (US)

(72) Inventors: Chester Hann Huei Chang, Painted Post, NY (US); Todd Benson Fleming, Elkland, PA (US); Dale Charles Marshall, Brockport, NY (US); Gary Edward Merz, Rochester, NY (US); Christopher Michael Rhoads, Seattle, WA (US); John Earl Tosch, Wellsburg, NY (US); Thaddeus Francis Trzeciak, Naples, NY (US)

(73) Assignee: Corning Incorporated, Corning, NY (US)

(*) Notice: Subject to any disclaimer, the term of this patent is extended or adjusted under 35 U.S.C. 154(b) by 166 days.

(21) Appl. No.: 14/804,605

(22) Filed: Jul. 21, 2015

(65) Prior Publication Data
US 2015/0321943 A1    Nov. 12, 2015

Related U.S. Application Data

(62) Division of application No. 13/673,385, filed on Nov. 9, 2012, now Pat. No. 9,216,924.

(51) Int. Cl.
*B26D 7/06*    (2006.01)
*B26F 3/00*    (2006.01)
(Continued)

(52) U.S. Cl.
CPC .............. *C03B 21/00* (2013.01); *B26D 7/32* (2013.01); *B65G 49/064* (2013.01);
(Continued)

(58) Field of Classification Search
CPC ....... G02B 1/04; C03B 33/033; C03B 33/091; C03B 33/102; C03B 33/105;
(Continued)

(56) References Cited

U.S. PATENT DOCUMENTS 2,414,772 A * 1/1947 Sheperdson ........... B23D 25/12
                                                              83/106
3,191,857 A * 6/1965 Galey ................ B23D 36/0066
                                                              234/128
(Continued)

FOREIGN PATENT DOCUMENTS

EP    2236281 A1    6/2010
EP    2332856 A1    6/2011
(Continued)

*Primary Examiner* — Ghassem Alie
*Assistant Examiner* — Bharat C Patel
(74) *Attorney, Agent, or Firm* — Kevin M. Able; Brian A. Tent

(57) ABSTRACT

Methods of processing a glass ribbon are provided. The method includes the step of traversing the glass ribbon through a travel path at a predetermined velocity and severing the glass ribbon to create an upstream web and a downstream web. The method further includes the step of increasing a relative velocity of a downstream edge portion with respect to an upstream edge portion to create a gap between an upstream severed edge and a downstream severed edge. In other example methods, a segment of the glass ribbon is removed to create a gap between an upstream severed edge and a downstream severed edge. In still further example methods, an upstream severed edge is directed along a second travel path to create a gap between the upstream severed edge and a downstream severed edge.

7 Claims, 19 Drawing Sheets

(51) Int. Cl.
| | |
|---|---|
| *B65H 35/00* | (2006.01) |
| *C03B 21/00* | (2006.01) |
| *B65G 49/06* | (2006.01) |
| *B26D 7/32* | (2006.01) |
| *C03B 33/023* | (2006.01) |
| *C03B 33/09* | (2006.01) |
| *C03B 33/033* | (2006.01) |

(52) U.S. Cl.
CPC ........ *B65G 49/065* (2013.01); *C03B 33/0235* (2013.01); *C03B 33/033* (2013.01); *C03B 33/091* (2013.01); *B65H 2301/121* (2013.01); *B65H 2801/61* (2013.01); *Y02P 40/57* (2015.11); *Y10T 83/0448* (2015.04); *Y10T 83/0462* (2015.04); *Y10T 83/0467* (2015.04)

(58) Field of Classification Search
CPC ..... C03B 17/064; C03B 21/00; C03B 33/235; B26D 7/32; B65G 49/064; B65G 49/065; Y10T 83/0462; Y10T 83/0448; B65H 2301/121; B65H 2801/61; Y02P 40/57
USPC .......... 225/2–3; 83/26, 423, 15–16, 27, 110; 428/192, 337, 76, 189; 242/160.4, 520, 242/526; 65/90, 29.14, 105, 112, 273
See application file for complete search history.

(56) References Cited

U.S. PATENT DOCUMENTS

| | | | | |
|---|---|---|---|---|
| 3,432,901 | A | | 3/1969 | Fanning |
| 3,490,712 | A | * | 1/1970 | Hideo ................ B65H 23/1806 242/412.3 |
| 3,744,690 | A | * | 7/1973 | Gray ................... C03B 33/0235 225/2 |
| 3,844,189 | A | * | 10/1974 | Jardine ................ B21C 47/34 226/97.1 |
| 4,049,167 | A | * | 9/1977 | Guissard ............. C03B 33/027 225/103 |
| 4,454,972 | A | * | 6/1984 | Maltby, Jr. .......... C03B 33/0235 225/2 |
| 4,533,073 | A | * | 8/1985 | Bier ..................... B65G 47/31 198/575 |
| 4,612,030 | A | | 9/1986 | Smids |
| 4,695,004 | A | | 9/1987 | Grossmann et al. |
| 4,743,284 | A | * | 5/1988 | Mouly ................... C03B 21/02 65/105 |
| 5,014,489 | A | * | 5/1991 | Terminella .............. B65B 61/28 53/228 |
| 5,062,582 | A | * | 11/1991 | Harmon ................ B26D 7/1827 242/412.2 |
| 5,267,703 | A | * | 12/1993 | Biagiotti ................ B65H 18/16 242/541.7 |
| 5,341,916 | A | * | 8/1994 | Doane .................... B65G 43/08 198/460.1 |
| 5,871,134 | A | * | 2/1999 | Komagata ............. C03B 33/033 225/2 |
| 6,039,283 | A | * | 3/2000 | Munoz-Baca .......... B21C 47/34 242/531.1 |
| 6,317,951 | B1 | * | 11/2001 | Karaki ................... G03B 17/26 29/402.01 |
| 6,502,423 | B1 | * | 1/2003 | Ostendarp ............. C03B 17/06 65/100 |
| 6,629,593 | B2 | * | 10/2003 | Zeitler ................... B65G 43/08 198/460.1 |
| 6,752,348 | B2 | | 6/2004 | Dreckmann et al. |
| 7,086,626 | B2 | * | 8/2006 | Komai ................... G11B 23/113 242/523.1 |
| 7,264,193 | B2 | | 9/2007 | Hikita |
| 7,597,282 | B2 | | 10/2009 | Endo et al. |
| 8,051,679 | B2 | | 11/2011 | Abramov et al. |
| 8,157,200 | B2 | | 4/2012 | Vaughn et al. |
| 8,196,737 | B2 | * | 6/2012 | Brayman ............... B65G 15/00 198/461.1 |
| 8,241,751 | B2 | | 8/2012 | Tomamoto et al. |
| 8,269,138 | B2 | | 9/2012 | Garner et al. |
| 8,292,141 | B2 | | 10/2012 | Cox et al. |
| 8,322,160 | B2 | | 12/2012 | Nishiura et al. |
| 8,322,161 | B2 | | 12/2012 | Nishiura et al. |
| 8,714,342 | B2 | * | 5/2014 | Halloran ........... H01L 21/67173 198/460.1 |
| 8,769,989 | B2 | | 7/2014 | Mitsugi et al. |
| 9,216,924 | B2 | * | 12/2015 | Chang .................. C03B 33/033 |
| 2007/0169849 | A1 | * | 7/2007 | Yahagi ................. C03B 33/091 144/366 |
| 2007/0271957 | A1 | | 11/2007 | Nakamura et al. |
| 2008/0264994 | A1 | * | 10/2008 | Herve ................. C03B 33/0215 225/2 |
| 2010/0025516 | A1 | * | 2/2010 | Barsacchi ............ B25J 15/0616 242/533.2 |
| 2010/0025517 | A1 | * | 2/2010 | Cere ..................... B65B 11/025 242/559.1 |
| 2010/0107848 | A1 | * | 5/2010 | Joseph, II ............... C03B 21/04 83/862 |
| 2010/0195634 | A1 | | 8/2010 | Thompson |
| 2010/0276066 | A1 | | 11/2010 | Kondo |
| 2010/0283943 | A1 | * | 11/2010 | Kimura ............... B32B 38/1841 349/96 |
| 2011/0023548 | A1 | * | 2/2011 | Garner .................... B32B 17/06 65/106 |
| 2011/0059296 | A1 | | 3/2011 | Wada et al. |
| 2011/0085125 | A1 | * | 4/2011 | Kimura ................. B32B 41/00 349/187 |
| 2011/0177290 | A1 | * | 7/2011 | Tomamoto ........... B32B 17/064 428/142 |
| 2011/0177325 | A1 | | 7/2011 | Tomamoto et al. |
| 2011/0200812 | A1 | | 8/2011 | Tomamoto et al. |
| 2011/0217521 | A1 | * | 9/2011 | Teranishi .................. B32B 3/02 428/189 |
| 2011/0223386 | A1 | | 9/2011 | Tomamoto et al. |
| 2011/0289766 | A1 | * | 12/2011 | Kim ..................... H01M 10/0404 29/623.1 |
| 2012/0017642 | A1 | * | 1/2012 | Teranishi ............. B28D 5/0011 65/105 |
| 2012/0024928 | A1 | * | 2/2012 | Matsumoto ........... B28D 1/221 225/2 |
| 2012/0027494 | A1 | * | 2/2012 | Kawashima ........... B41J 15/044 400/619 |
| 2012/0125967 | A1 | * | 5/2012 | Furuta ................... C03B 33/0235 225/3 |
| 2012/0247154 | A1 | * | 10/2012 | Abramov ............. C03B 33/0235 65/54 |
| 2012/0255672 | A1 | * | 10/2012 | Marshall .................. B32B 3/04 156/216 |
| 2012/0258584 | A1 | | 10/2012 | Garner et al. |
| 2012/0301683 | A1 | * | 11/2012 | Li ......................... B65D 85/48 428/192 |
| 2015/0259236 | A1 | | 9/2015 | Marshall et al. |

FOREIGN PATENT DOCUMENTS

| | | |
|---|---|---|
| EP | 2336048 A1 | 6/2011 |
| EP | 2336049 A1 | 6/2011 |
| EP | 2336050 A1 | 6/2011 |
| EP | 2343248 A1 | 7/2011 |
| EP | 2505566 A1 | 10/2012 |
| WO | 0214229 A1 | 2/2002 |

* cited by examiner

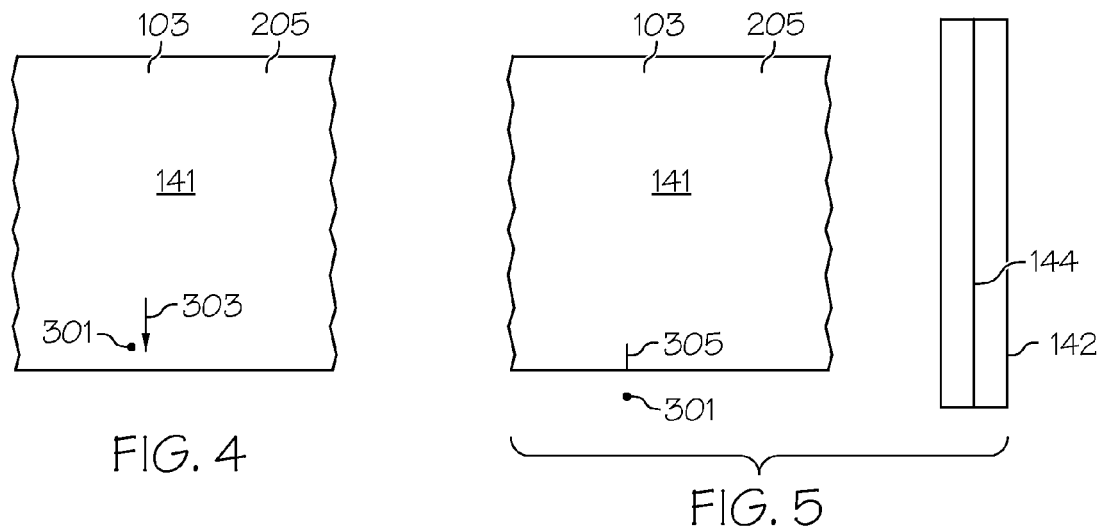
FIG. 4
FIG. 5
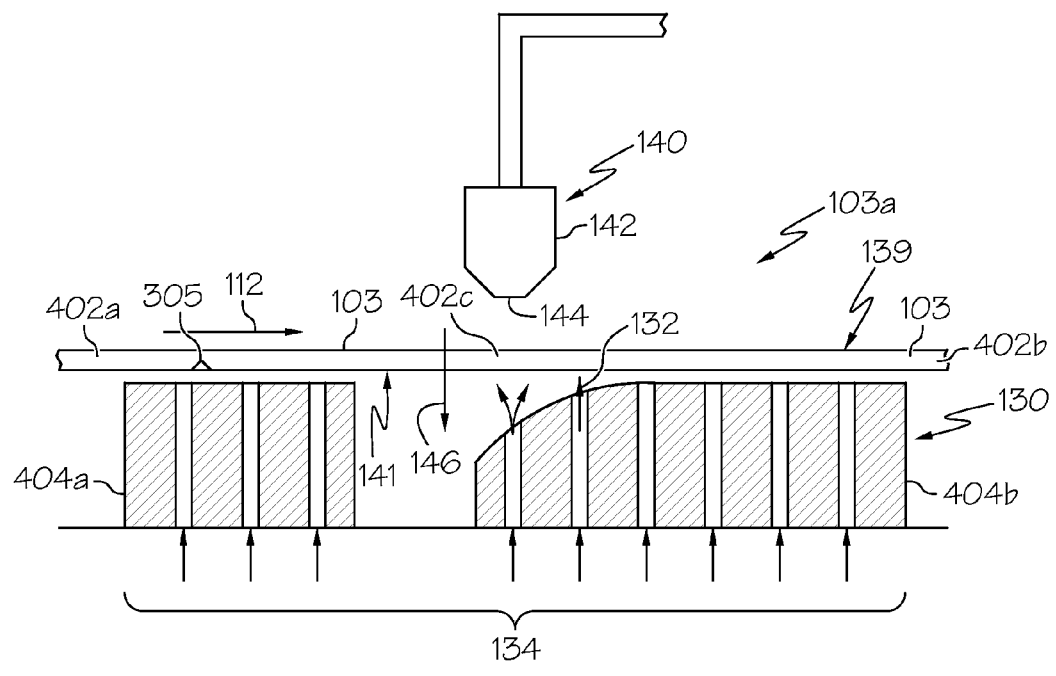
FIG. 6

METHODS OF PROCESSING A GLASS RIBBON

This application is a divisional of U.S. patent application Ser. No. 13/673,385, filed on Nov. 9, 2012, the content of which is relied upon and incorporated herein by reference in its entirety, and the benefit of priority under 35 U.S.C. §120 is hereby claimed.

TECHNICAL FIELD

The present invention relates generally to methods of processing a glass ribbon and, more particularly, to methods of processing a glass ribbon that creates a gap between an upstream severed edge and a downstream severed edge.

BACKGROUND

Glass ribbon is known to be used to manufacture various glass products such as LCD sheet glass. Processing of the glass ribbon can be performed with a "roll-to-roll" process where glass ribbon is unwound from an upstream storage roll and then subsequently wound on a downstream storage roll.

SUMMARY

The following presents a simplified summary of the disclosure in order to provide a basic understanding of some example aspects described in the detailed description.

In a first aspect, a method of processing a glass ribbon includes the step (I) of traversing the glass ribbon through a travel path at a predetermined velocity. The method further includes the step (II) of severing the glass ribbon along a direction transverse to the travel path to create an upstream web comprising a upstream edge portion including a upstream severed edge and a downstream web comprising an downstream edge portion including an downstream severed edge. The method further includes the step (III) of increasing a relative velocity of the downstream edge portion with respect to the upstream edge portion to create a gap between the upstream severed edge and the downstream severed edge.

In one example of the first aspect, step (III) includes increasing the velocity of the downstream edge portion to provide the increased relative velocity of the downstream edge portion with respect to the upstream edge portion.

In another example of the first aspect, an amount of the downstream web is collected by an accumulator to increase the velocity of the downstream edge portion.

In still another example of the first aspect, step (III) comprises decreasing the velocity of the upstream edge portion to provide the increased relative velocity of the downstream edge portion with respect to the upstream edge portion.

In yet another example of the first aspect, an amount of the upstream web is collected by an accumulator to decrease the velocity of the upstream edge portion.

In still another example of the first aspect, the glass ribbon of step (I) includes a width extending transverse to the travel path between a first side edge and a second side edge. At least one of the first or second side edge includes a handling tab with a mounting portion including an aperture configured to expose the entire respective first or second side edge within a target area. Step (II) includes severing the glass ribbon through the at least one of the first or second side edge within the target area.

In another example of the first aspect, step (II) is initiated in response to a storage roll reaching a predetermined storage capacity.

In yet another example of the first aspect, after step (III), the downstream web is wound on a first storage roll, and the upstream edge portion of the upstream web is introduced to a second storage roll to begin winding the upstream web on the second storage roll.

The first aspect may be carried out alone or in combination with one or more of the examples of the first aspect discussed above.

In a second aspect, a method of processing a glass ribbon comprising the step (I) of traversing the glass ribbon through a travel path at a predetermined velocity. The method further includes the step (II) of severing the glass ribbon at a first location transverse to the travel path. The method still further includes the step (III) of severing the glass ribbon at a second location transverse to the travel path such that a segment of glass ribbon is severed from an upstream web including an upstream severed edge and a downstream web including a downstream severed edge. The method also includes the step (IV) of removing the segment of the glass ribbon such that a gap is created between the upstream severed edge and the downstream severed edge.

In one example of the second aspect, a sever path created during step (II) is substantially parallel to a sever path created during step (III).

In another example of the second aspect, the glass ribbon of step (I) includes a width extending transverse to the travel path between a first side edge and a second side edge, wherein at least one of the first or second side edge includes a handling tab with a mounting portion including an aperture configured to expose the entire respective first or second side edge within a target area. Furthermore, step (II) includes severing the glass ribbon through the at least one of the first or second side edge within the target area.

In still another example of the second aspect, step (II) is initiated in response to a storage roll reaching a predetermined storage capacity.

In yet another example of the second aspect, after step (IV), the downstream web is wound on a first storage roll, and the downstream severed edge of the upstream web is introduced to a second storage roll to begin winding the upstream web on the second storage roll.

The second aspect may be carried out alone or in combination with one or more of the examples of the second aspect discussed above.

In a third aspect, a method of processing a glass ribbon comprises the step (I) of traversing the glass ribbon through a first travel path at a predetermined velocity to be wound on a first storage roll. The method further includes the step (II) of severing the glass ribbon along a direction transverse to the travel path to create an upstream web including an upstream severed edge and a downstream web including a downstream severed edge. The method further includes the step (III) of directing the upstream severed edge along a second travel path to create a gap between the upstream severed edge and the downstream severed edge.

In accordance with one example of the third aspect, step (III) includes directing the upstream severed edge along the second travel path to be wound on a second storage roll.

In accordance with another example of the third aspect, the glass ribbon of step (I) includes a width extending transverse to the travel path between a first side edge and a second side edge, wherein at least one of the first or second side edge includes a handling tab with a mounting portion including an aperture configured to expose the entire respective first or second side edge within a target area. Furthermore, step (II) includes severing the glass ribbon through the at least one of the first or second side edge within the target area.

In accordance with yet another example of the third aspect, step (II) is initiated in response to the first storage roll reaching a predetermined storage capacity.

The third aspect may be carried out alone or in combination with one or more of the examples of the third aspect discussed above.

BRIEF DESCRIPTION OF THE DRAWINGS

These and other aspects are better understood when the following detailed description is read with reference to the accompanying drawings, in which:

FIG. 4 is a sectional view along line 4-4 of FIG. 2 showing a scribe tip beginning to form a predetermined flaw in the first side of the glass ribbon;

FIG. 5 is a sectional view similar to FIG. 4 after forming the predetermined flaw;

FIG. 6 is an enlarged view of a severing zone of FIG. 2 with a portion of the glass ribbon including a predetermined flaw in a first orientation;

DETAILED DESCRIPTION

Figure 1:
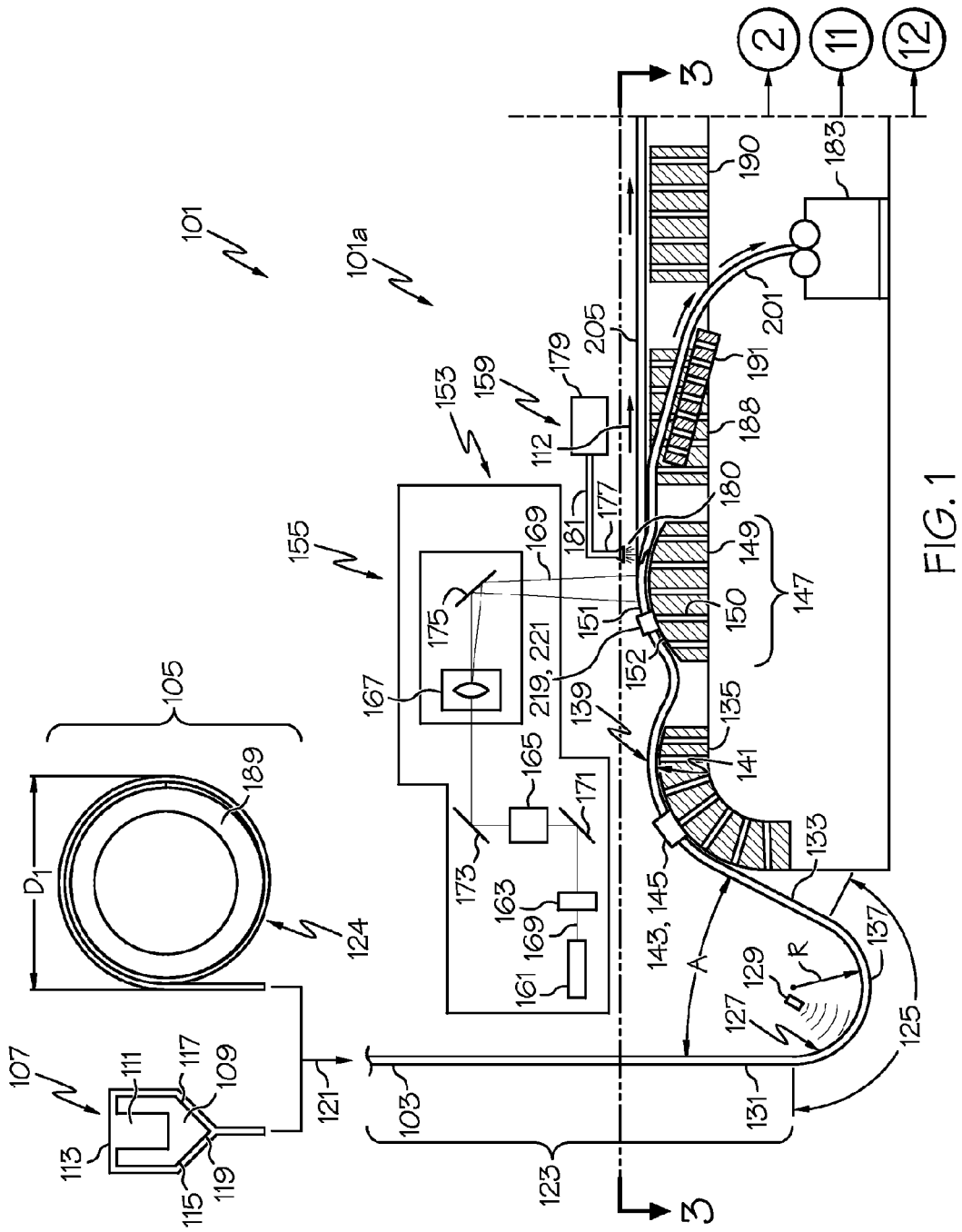
FIG. 1 is a schematic illustration of an edge separation apparatus.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 2:
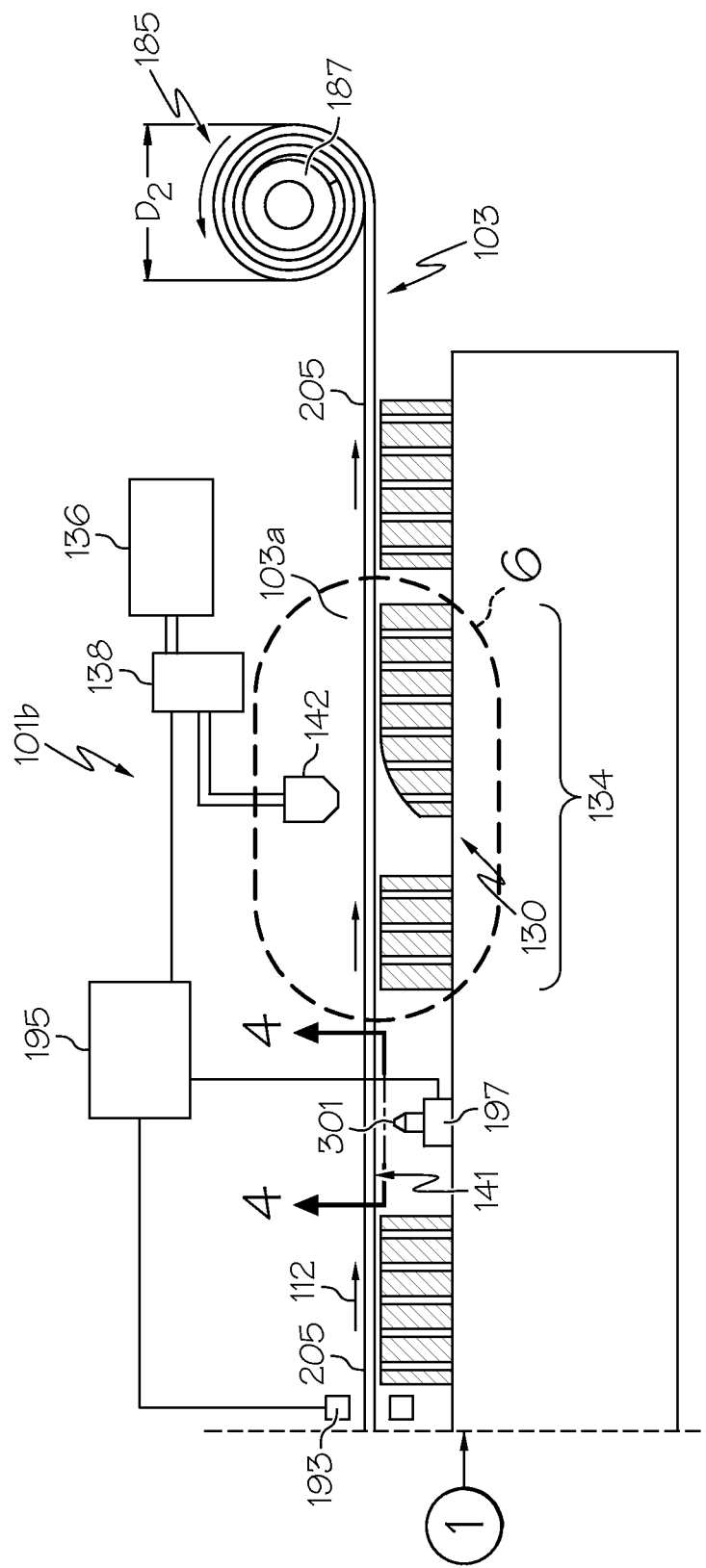
FIG. 2 is a schematic illustration of an apparatus for severing a glass ribbon.

FIGS. 1 and 2 illustrate just one example of an apparatus 101 for fabricating a glass ribbon 103. As shown, FIG. 2 is a continuation of FIG. 1, wherein FIGS. 1 and 2 can be read together as the overall configuration of the apparatus 101. Examples of the apparatus 101 can include an edge separation apparatus 101a illustrated in FIG. 1 although the edge separation apparatus may be omitted in further examples. In addition or alternatively, as shown in FIG. 2, the apparatus 101 can also include an apparatus 101b for severing a glass ribbon. The edge separation apparatus 101a, for example, may be optionally employed to remove beads or other edge imperfections as described more fully below. Alternatively, the edge separation apparatus 101a may be used to divide the glass ribbon for further processing of the central portion and/or edge portions. The apparatus 101b for severing a glass ribbon can be provided, for example, to help sever a sheet to the desired length, remove an undesirable segment of glass ribbon from the source of glass ribbon, and/or facilitate switching between a first storage roll and a second storage roll with minimal, if any, disruption in traversing of the glass ribbon from the source of glass ribbon.

The glass ribbon 103 for the apparatus 101 can be provided by a wide range of glass ribbon sources. FIG. 1 illustrates two example sources 105 of glass ribbon 103 although other sources may be provided in further examples. For instance, as shown in FIG. 1, the source 105 of glass ribbon 103 can comprise a down draw glass forming apparatus 107. As schematically shown, the down draw glass forming apparatus 107 can include a forming wedge 109 at the bottom of a trough 111. In operation, molten glass 113 can overflow the trough 111 and flow down opposite converging sides 115, 117 of the forming wedge 109. Converging sides 115, 117 meet at a root 119. The two sheets of molten glass are subsequently fused together as they are drawn off the root 119 of the forming wedge 109. As such, the glass ribbon 103 may be fusion down drawn to traverse in a downward direction 121 off the root 119 of the forming wedge 109 and directly into a downward zone 123 positioned downstream from the down draw glass forming apparatus 107. Other down draw forming methods for the glass ribbon source 105 such as slot draw are also possible. Regardless of the source or method of production, the glass ribbon 103 can possibly have a thickness of ≤500 microns, ≤300 microns, ≤200 microns, or ≤100 microns. In one example, the glass ribbon 103 can include a thickness of from about 50 microns to about 300 microns, for example 50, 60, 80, 100, 125, 150, 175, 200, 225, 250, 260, 270, 280, 290, or 300 microns, although other thicknesses may be provided in further examples. The glass ribbon 103 can possibly have a width of ≥20 mm, ≥50 mm, ≥100 mm, ≥500 mm, or ≥1000 mm. The glass ribbon 103 can possibly have a variety of compositions including but not limited to soda-lime, borosilicate, alumino-borosilicate, alkali-containing, or alkali-free. The glass ribbon 103 can possibly have a coefficient of thermal expansion of ≤15 ppm/° C., ≤10 ppm/° C., or ≤5 ppm/° C. The glass ribbon 103 can possibly have a speed as it traverses along travel direction 112 of ≥50 mm/s, ≥100 mm/s, or ≥500 mm/s.

Figure 3:
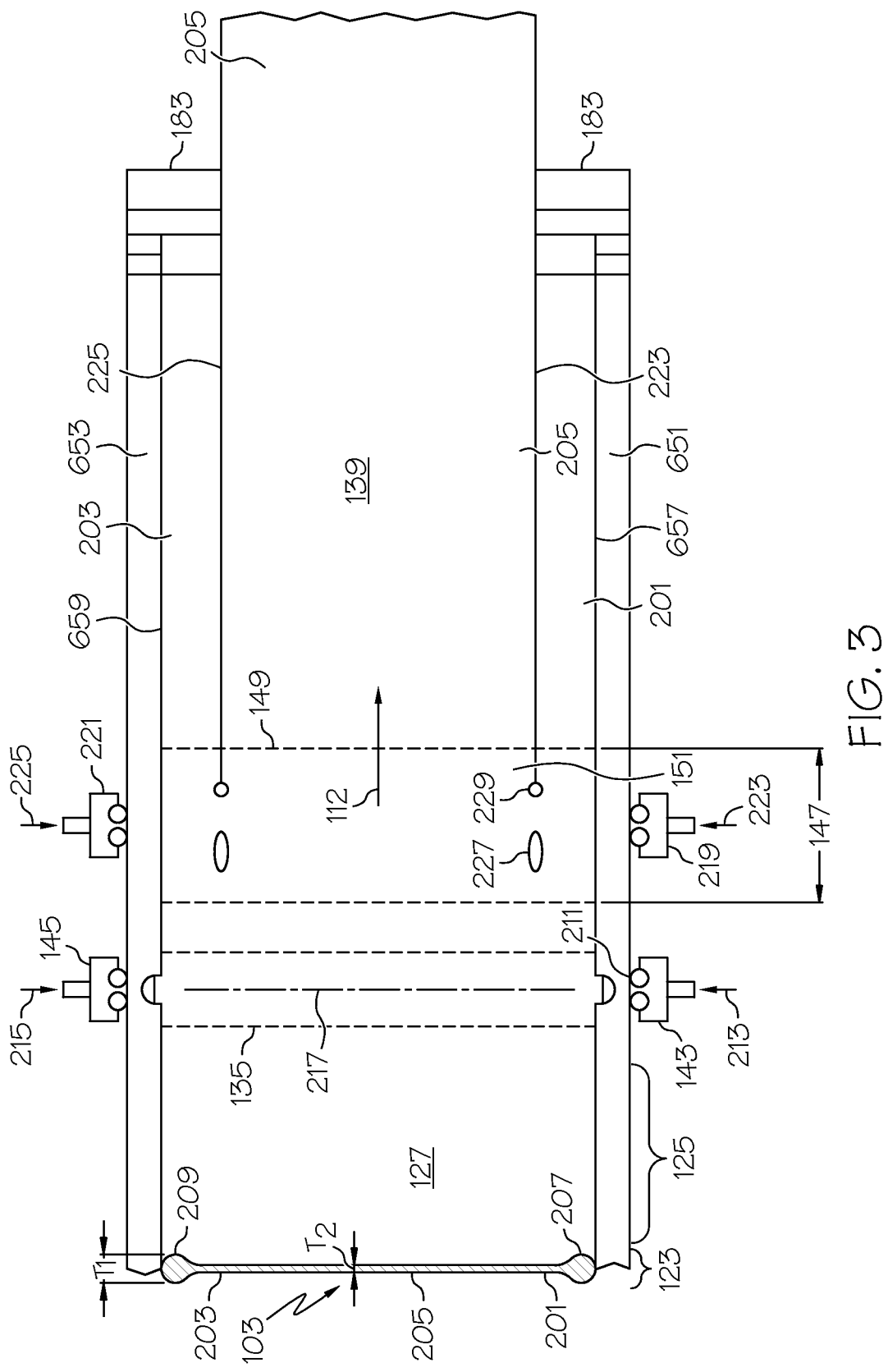
FIG. 3 is a sectional view of the edge separation apparatus along line 3-3 of FIG. 1.

As shown by the cross section of FIG. 3, the glass ribbon 103 can include a pair of opposed edge portions 201, 203 and a central portion 205 spanning between the opposed edge portions 201, 203. Due to the down draw fusion process, the edge portions 201, 203 of the glass ribbon may have corresponding beads 207, 209 with a thickness "$T_1$" that is greater than a thickness "$T_2$" of the central portion 205 of the glass ribbon 103. The apparatus 101 can be designed to process glass ribbons 103 with a thin central portion 205, such as glass ribbons with a thickness "$T_2$" in a range of from about 20 microns to about 300 microns (e.g., 20, 30, 40, 50, 60, 70, 80, 90, 100, 110, 120, 130, 140, 150, 170, 190, 210, 230, 250, 260, 270, 280, 290, or 300 microns, for example), such as from about 50 microns to about 300 microns, such as from about 85 microns to about 150 microns although glass ribbons with other thicknesses may be processed in further examples. In addition or alternatively to what is shown in FIG. 3, the edge beads 207, 209 may have non-circular shapes such as elliptical, oblong, rectangular, or other shapes with convex or other features.

Turning back to FIG. 1, another example source 105 of glass ribbon 103 can comprise a coiled spool 124 of glass ribbon 103. For example, glass ribbon 103 may be wound into the coiled spool 124 after being drawn into a glass ribbon, for example, with the down draw glass forming apparatus 107. The glass ribbon 103 rolled or coiled on the spool 124 may or may not have the illustrated edge beads 201, 203. However, if the greater thickness of the edge portions 201, 203 are present, they may increase the minimum bend radius required to avoid cracking or breaking the glass ribbon. As such, if coiled, the glass ribbon 103 may be coiled with a relatively large bend radius such that a given length of glass ribbon 103 would require a coiled spool 124 with a relatively large diameter "$D_1$". Thus, if the source 105 comprises the coiled spool 124, the glass ribbon 103 may be uncoiled from the coiled spool 124 of glass ribbon 103 to traverse the glass ribbon 103 in the downward direction 121 into the downward zone 123.

FIGS. 1 and 2 illustrate aspects of just one example edge separation apparatus 101a that may be optionally included although, if provided, other edge separation apparatus may be incorporated in further examples. As shown in FIG. 1, the optional edge separation apparatus can include a bending zone 125 downstream from the downward zone 123. In the bending zone 125, the edge separation apparatus 101a can be designed to permit the glass ribbon 103 to travel through a curved path such that an upper surface 127 of the glass ribbon 103 comprises an upwardly concave surface as the ribbon bends through a radius "R" within the bending zone 125. The radius "R" may be greater than a minimum bend radius of the glass ribbon 103 to avoid excessive stress concentrations in the glass ribbon 103. The glass ribbon 103 may extend through various arcs within the bending zone 125 such that a pre-bending portion 131 of the glass ribbon 103 entering the bending zone 125 can extend at various angles with respect to a post-bending portion 133 of the glass ribbon 103. For example, as shown in FIG. 1, the angle "A" between the pre-bending portion 131 and the post-bending portion 133 can comprise an acute angle although angles of 90° or more may be provided in further examples while still providing the upwardly concave surface 127.

The edge separation apparatus 101a can further include an optional bending support member 135 in examples where the elevation of a lower portion 137 of the glass ribbon within the bending zone 125 is lower than a lateral travel elevation of the glass ribbon passing through support portions leading to a cutting zone 147. The bending support member 135, if provided, can comprise a non-contact support member 135 designed to support the glass ribbon 103 without touching the opposed first and second sides 141, 139 of the central portion 205 of the glass ribbon 103. For example, the bending support member 135 can comprise one or more curved air bars configured to provide a cushion of air to space the glass ribbon from contacting the bending support member 135.

Examples of the edge separation apparatus 101a can include lateral guides 143, 145 to help orient the glass ribbon 103 in the correct lateral position relative to a travel direction 112 of the glass ribbon 103. For example, as schematically shown in FIG. 3, the lateral guides can each comprise rollers 211 configured to engage a corresponding one of the opposed edge portions 201, 203, or if provided, corresponding handling tabs 651, 653. Handling tabs 651, 653 may be, for example, a polymeric tape applied to the edge portions. Corresponding forces 213, 215 applied to the edge portions 201, 203 by the corresponding lateral guides 143, 145 can help properly shift and align the glass ribbon 103 in the proper lateral orientation along a direction of an axis 217 transverse to the travel direction 112 of the glass ribbon 103. The cutting zone produces an edge quality that possibly enables the central portion 205 to be bent at a radius of ≤500 mm, ≤300 mm, ≤200 mm, ≤100 mm, or ≤50 mm.

As further illustrated, the lateral guides 143, 145 can be designed to engage the edge portions 201, 203, or corresponding handling tabs 651, 653, without engaging the central portion 205 of the glass ribbon 103. As such, the pristine surfaces of the opposed sides 139, 141 of the central portion 205 of the glass ribbon 103 can be maintained while avoiding undesired scratching or other surface contamination that might otherwise occur if the lateral guides 143, 145 were to engage either of the opposed first and second sides 141, 139 of the central portion 205 of the glass ribbon 103. Engagement on the edge portions 201, 203, or corresponding handling tabs 651, 653, also prevents damage or contamination to opposed edges 223, 225 of the central portion 205 which could degrade the strength of central portion 205 and increase the probability of breakage when central portion 205 is bent such as when rolled onto storage spool 185. Moreover, the lateral guides 143, 145 may engage the glass ribbon 103 as it is being bent about the axis 217 transverse to the travel direction 112 of the glass ribbon 103. Bending the glass ribbon 103 over the bending support member 135 can increase the rigidity of the glass ribbon 103 throughout the bend. As such, the lateral guides 143, 145 can apply lateral forces to the glass ribbon 103 in a bent condition as the glass ribbon 103 passes over the bending support member 135. The forces 213, 215 applied by the lateral guides 143, 145 are therefore less likely to buckle or otherwise disturb the stability of the glass ribbon profile when laterally aligning as the glass ribbon 103 passes over the bending support member 135.

The edge separation apparatus can further include a cutting zone 147 downstream from the bending zone 125. In one example, the edge separation apparatus 101a may include a cutting support member 149 configured to bend the glass ribbon 103 in the cutting zone 147 to provide a bent target segment 151 with a bent orientation in the cutting zone 147. Bending the target segment 151 within the cutting zone 147 can help stabilize the glass ribbon 103 during the cutting procedure. Such stabilization can help prevent buckling or disturbing the glass ribbon profile during the procedure of severing at least one of the opposed edge portions 201, 203 from the central portion 205 of the glass ribbon 103. The cutting zone produces an edge quality that possibly enables the central portion 205 to be bent at a radius of ≤500 mm, ≤300 mm, ≤200 mm, ≤100 mm, or ≤50 mm.

The cutting support member 149, if provided, can comprise a non-contact cutting support member 149 designed to support the glass ribbon 103 without touching the opposed sides 139, 141 of the glass ribbon 103. For example, the non-contact cutting support member 149 can comprise one or more curved air bars configured to provide a cushion of air space between the glass ribbon 103 and the cutting support member 149 to prevent the central portion 205 of the glass ribbon 103 from contacting the cutting support member 149.

In one example, the cutting support member 149 can be provided with a plurality of passages 150 configured to provide positive pressure ports such that an air stream can be forced through the positive pressure ports toward the bent target segment 151 to create an air cushion for a noncontact support of the bent target segment 151. Optionally, the plurality of passages 150 can include negative pressure ports such that an air stream can be drawn away from the bent target segment 151 to create a suction to partially counteract the force from the air cushion created by the positive pressure ports. A combination of positive and negative pressure ports can help stabilize the bent target segment 151 throughout the cutting procedure. Indeed, the positive pressure ports can help maintain a desired air cushion height between the central portion 205 of the glass ribbon 103 and the cutting support member 149. At the same time, the negative pressure ports can help pull the glass ribbon toward the cutting support member 149 to prevent the glass ribbon 103 from undulating and/or prevent portions of the bent target segment 151 from floating away when traversing over the cutting support member 149 in the travel direction 112.

Providing a bent target segment 151 in the cutting zone 147 can also increase the rigidity of the glass ribbon 103 throughout the cutting zone 147. Increasing the rigidity of the glass ribbon 103 throughout the cutting zone 147 can help reduce changes in orientation due to natural shape variation of the incoming ribbon 103 which can produce undesirable variation in the cutting process. Increasing the rigidity of the glass ribbon 103 throughout the cutting zone 147 can also reduce the impact of mechanical perturbations and vibrations on the cutting process. Also, as shown in FIG. 3, optional lateral guides 219, 221 can apply lateral forces to the glass ribbon 103 in a bent condition as the glass ribbon 103 passes over the cutting support member 149 within the cutting zone 147. Forces 223, 225 applied by the lateral guides 219, 221 are therefore less likely to buckle or otherwise disturb the stability of the glass ribbon profile when laterally aligning as the glass ribbon 103 passes over the cutting support member 149. The optional lateral guides 219, 221 can therefore be provided to fine tune the bent target segment 151 at the proper lateral orientation along a direction of the axis 217 transverse to the travel direction 112 of the glass ribbon 103.

As set forth above, providing the bent target segment 151 in a bent orientation within the cutting zone 147 can help stabilize the glass ribbon 103 during the cutting procedure. Such stabilization can help prevent buckling or disturbing the glass ribbon profile during the procedure of severing at least one of the opposed edge portions 201, 203. Moreover, the bent orientation of the bent target segment 151 can increase the rigidity of the target segment to allow optional fine tune adjustment of the lateral orientation of the bent target segment 151. As such, relatively thin glass ribbons 103 can be effectively stabilized and properly laterally oriented without contacting the pristine opposed first and second sides 141, 139 of the central portion 205 of the glass ribbon 103 during the procedure of severing at least one of the opposed edge portions 201, 203 from the central portion 205 of the glass ribbon 103.

Increased stabilization and rigidity of the bent target segment 151 of the glass ribbon 103 can be achieved by bending the target segment to include an upwardly convex surface and/or an upwardly concave surface along a direction of the axis 217 transverse to the travel direction 112. For example, as shown in FIG. 1, the bent target segment 151 includes a bent orientation with an upwardly facing convex surface 152 configured to bend the glass ribbon 103 in the cutting zone 147 to achieve the illustrated bent orientation. Although not shown, further examples may include supporting the target segment 151 with an upwardly facing concave surface configured to allow the bent target segment to achieve an upwardly facing concave surface.

The edge separation apparatus 101a can further include a wide range of cutting devices configured to sever the edge portions 201, 203 from the central portion 205 of the glass ribbon 103. In one example, as shown in FIG. 1, one example glass cutting device 153 can include an optical delivery apparatus 155 for irradiating and therefore heating a portion of the upwardly facing surface of the bent target segment 151. In one example, optical delivery apparatus 155 can comprise a radiation source such as the illustrated laser 161 although other radiation sources may be provided in further examples. The optical delivery apparatus 155 can further include a circular polarizer 163, a beam expander 165, and a beam shaping apparatus 167.

The optical delivery apparatus 155 may further comprise optical elements for redirecting a beam of radiation (e.g., laser beam 169) from the radiation source (e.g., laser 161), such as mirrors 171, 173 and 175. The radiation source can comprise the illustrated laser 161 configured to emit a laser beam having a wavelength and a power suitable for heating the glass ribbon 103 at a location where the beam is incident on the glass ribbon 103. In one embodiment, laser 161 can comprise a $CO_2$ laser although other laser types may be used in further examples.

The laser 161 may be configured to initially emit the laser beam 169 with a substantially circular cross section (i.e. the cross section of the laser beam at right angles to the longitudinal axis of the laser beam). The optical delivery apparatus 155 is operable to transform laser beam 169 such that the beam has a significantly elongated shape when incident on glass ribbon 103. As shown in FIG. 3, the elongated shape can produce an elongated radiation zone 227 that may include the illustrated elliptical footprint although other configurations may be provided in further examples. The elliptical foot print can be positioned on the upwardly facing convex or concave surface of the bent target segment 151. Heat from the elongated radiation zone 227 can transmit through the entire thickness of the glass ribbon 103.

The boundary of the elliptical footprint can be determined as the point at which the beam intensity has been reduced to $1/e^2$ of its peak value, wherein "e" is the base of the natural logarithm. The laser beam 169 passes through circular polarizer 163 and is then expanded by passing through beam expander 165. The expanded laser beam then passes through beam shaping apparatus 167 to form a beam producing the elliptical footprint on a surface of the bent target segment 151. The beam shaping apparatus 167 may, for example, comprise one or more cylindrical lenses. However, it should be understood that any optical elements capable of shaping the beam emitted by laser 161 to produce an elliptical footprint on the bent target segment 151 may be used.

The elliptical footprint can include a major axis that is substantially longer than a minor axis. In some embodiments, for example, the major axis is at least about ten times longer than the minor axis. However, the length and width of the elongated radiation zone are dependent upon the desired severing speed, desired initial defect size, thickness of the glass ribbon, laser power, material properties of the glass ribbon, etc., and the length and width of the radiation zone may be varied as needed.

As further shown in FIG. 1, the example glass cutting device 153 can also include a coolant fluid delivery apparatus 159 configured to cool the heated portion of the upwardly facing surface of the bent target segment 151. The coolant fluid delivery apparatus 159 can comprise a coolant nozzle 177, a coolant source 179 and an associated conduit 181 that may convey coolant to the coolant nozzle 177. As shown in FIG. 1, the forced fluid cooling can occur on the same side of the glass as the incident heating source. As shown, the forced fluid cooling and incident heating sources can be applied to the upper surface of the glass although they can both be applied to the lower surface in further examples. Still further, the heat source and cooling source can be incident on opposite surfaces of the glass ribbon. For example, one of the forced fluid cooling source and the heating source can be positioned to act on an upper surface of the ribbon while the other of the forced fluid cooling source and the heating source acts on the lower surface of the ribbon. In such a configuration, the oppositely located cooling and heating sources can be counter-propagating.

With reference to FIG. 1, the coolant nozzle 177 can be configured to deliver a coolant jet 180 of coolant fluid to the upwardly facing surface of the bent target segment 151. The coolant nozzle 177 can have various internal diameters to form a cooling zone 229 (see FIG. 3) of a desired size. As with elongated radiation zone 227, the diameter of coolant nozzle 177, and the subsequent diameter of coolant jet 180, may be varied as needed for the particular process conditions. In some embodiments, the area of the glass ribbon immediately impinged upon by the coolant (cooling zone) can have a diameter shorter than the minor axis of the radiation zone 227. However, in certain other embodiments, the diameter of the cooling zone 229 may be larger than the minor axis of elongated radiation zone 227 based on process conditions such as speed, glass thickness, material properties of the glass ribbon, laser power, etc. Indeed, the (cross sectional) shape of the coolant jet may be other than circular, and may, for example, have a fan shape such that the cooling zone forms a line rather than a circular spot on the surface of the glass ribbon. A line-shaped cooling zone may be oriented, for example, perpendicular to the major axis of elongated radiation zone 227. Other shapes may be beneficial.

In one example, the coolant jet 180 comprises water, but may be any suitable cooling fluid (e.g., liquid jet, gas jet or a combination thereof) that does not permanently stain or damage the upwardly facing surface of the bent target segment 151 of the glass ribbon 103. The coolant jet 180 can be delivered to a surface of the glass ribbon 103 to form the cooling zone 229. As shown, the cooling zone 229 can trail behind the elongated radiation zone 227 to propagate an initial defect formed by aspects of the disclosure described more fully below.

Although not shown, in some configurations coolant fluid delivery apparatus 159 may not be required to perform the cutting operation. For example, heat transfer to the environment (e.g., air flowing through the support member 149 and natural convection of the moving web) may provide all the cooling that is required to sustain the cutting process without the presence or operation of the coolant fluid delivery apparatus 159.

The combination of heating and cooling with the optical delivery apparatus 155 and the coolant fluid delivery apparatus 159 can effectively sever the edge portions 201, 203 from the central portion 205 while minimizing or eliminating undesired residual stress, microcracks or other irregularities in the opposed edges 223, 225 of the central portion 205 that may be formed by other severing techniques. Moreover, due to the bent orientation of the bent target segment 151 within the cutting zone 147, the glass ribbon 103 can be properly positioned and stabilized to facilitate precise severing of the opposed edges 223, 225 during the severing process. Still further, due to the convex surface topography of the upwardly facing convex support surface, the edge portions 201, 203 can immediately travel away from the central portion 205, thereby reducing the probability that the edge portions will subsequently engage (and therefore damage) the pristine first and second sides 141, 139 and/or the high quality opposed edges 223, 225 of the central portion 205. As shown in FIG. 1, two curved support members 135, 149 may be provided. In further examples, a single curved support member may be provided, thereby eliminating the need for a second curved support member.

Turning back to FIG. 1, the edge separation apparatus 101a may include structures configured to further process the severed edge portions 201, 203 and/or the central portion 205 of the glass ribbon 103 downstream from the cutting zone 147. For example, one or more glass ribbon choppers 183 may be provided to chop, shred, break or otherwise compact the trim segments for disposal or recycling.

The central portion 205 of the glass ribbon 103 can be further processed by cutting into glass sheets for incorporation into optical components. For example, the apparatus 101 may include the apparatus 101b for severing a glass ribbon described more fully below to sever the central portion 205 of the glass ribbon 103 along the axis 217 transverse to the travel direction 112 of the glass ribbon 103. In addition, or alternative to the apparatus 101b for severing a glass ribbon, the central portion 205 of the glass ribbon 103 can be coiled into a storage roll 185 for later processing. As shown, removing the edge portions 201, 203 consequently removes the corresponding beads 207, 209. Removing the beads reduces the minimum bend radius to allow the central portion 205 of the glass ribbon 103 to be more efficiently wound into a storage roll 185. As represented in FIG. 2, the central core 187 of the storage roll 185 is significantly reduced when compared to the central core 189 of the coiled spool 124. As such, the diameter "$D_2$" of the storage roll 185 of the central portion 205 is significantly smaller than the diameter "$D_1$" that would store the same length of pre-processed glass ribbon in the coiled spool 124.

Still further shown in FIG. 1, the edge separation apparatus 101a may also include further noncontact support members to guide at least the central portion 205 of the glass ribbon 103 downstream from the cutting zone 147. For example, as shown, the apparatus can include a first air bar 188 and a second air bar 190 to guide the central portion 205 of the glass ribbon for final processing without contacting the surfaces. Two support members are illustrated although a single support member or more than two support members may be provided in further examples. As further shown, an optional support member 191 can also be provided to allow the edge portion to be guided to the glass ribbon chopper 183. The optional support member 191 can optionally comprise an air bar or low friction surface to reduce binding and/or restricted movement as the edge portion proceeds to the glass ribbon choppers 183.

In some examples, the glass ribbon 103 may also travel directly from the source 105 of glass ribbon to an apparatus 101b for severing the glass ribbon 103. Alternatively, as shown, the edge separation apparatus 101a may optionally remove edge portions of the glass ribbon 103 at a location upstream. Subsequently, the central portion 205 of the glass ribbon 103 can travel with respect to the apparatus 101b for eventual final processing of the glass ribbon. In some examples, the glass ribbon can be severed into appropriate severed lengths. In further examples, an undesired segment (e.g., segment of low quality) can be removed from the otherwise continuous length of high quality glass ribbon. In still further examples, the glass ribbon can be stored on the illustrated storage roll 185. In one example, the apparatus 101b for severing the glass ribbon 103 can be used to switch between a full storage roll and a new storage roll without interrupting movement of the glass ribbon along travel direction 112.

FIG. 2 illustrates just one example of an apparatus 101b that may be used to selectively sever the glass ribbon 103 although other apparatus may be used in further examples. As shown in FIG. 2, the apparatus 101b may include a monitoring device 193 that may sense a characteristic of the glass ribbon 103 and send back a corresponding signal to a controller 195. Characteristics can include, but are not limited to, optical quality, inclusions, cracks, inhomogeneous features, thickness, color, surface flatness or imperfections, and/or other features. In one example, the monitoring device 193 may comprise a quality control device configured to screen the glass ribbon, either continuously or periodically, in an effort to ensure a high quality glass ribbon passing to be stored or further processed.

As further illustrated, the apparatus 101b may further include a device 197 configured to generate a predetermined flaw in the first side 141 of the glass ribbon 103. In one example, the device 197 can include the illustrated mechanical scoring device wherein a relatively sharp tip 301 may be used to score the first side 141 of the glass ribbon 103. In further examples, the device 197 can comprise a laser or other device configured to introduce the predetermined flaw at the edge, side surface, or within a portion along the width of the glass ribbon 103.

As further illustrated in FIG. 6, the apparatus 101b may optionally include a support member 130 configured to emit fluid 132 to impact the first side 141 of the glass ribbon 103 to at least partially support a weight of a portion 103a of the glass ribbon 103 within a severing zone 134 while maintaining the portion 103a of the glass ribbon 103 in a first orientation. As shown, the first orientation can comprise a substantially flat orientation that runs along the travel direction 112 although the first orientation may be curved or form other travel paths in further examples.

Examples of the apparatus 101b for severing the glass ribbon 103 can further include a device 140 configured to temporarily bend the portion 103a of the glass ribbon 103 in a direction 146 toward the support member from the first orientation (e.g., shown in FIG. 6) to a severing orientation (e.g., shown in FIGS. 7 and 8) by applying a force to the second side 139 of the glass ribbon 103. The device 140 for temporarily bending the portion 103a of the glass ribbon 103 can comprise a wide range of structures with various configurations.

FIG. 6 illustrates just one device 140 that may be used to temporarily bend the portion 103a of the glass ribbon 103. The example device 140 may include a fluid nozzle 142. As schematically shown in FIG. 5, the fluid nozzle 142 may extend along substantially the entire width of the glass ribbon 103. Furthermore, as shown, the nozzle 142 may have a width that is substantially greater than the width of the glass ribbon 103. The nozzle 142, if provided, can be a continuous nozzle and/or a plurality of nozzles spaced apart from one another in a row across the width of the glass ribbon.

The nozzle 142 can include an orifice 144 designed to emit fluid, such as gas, to impact the second side 139 of the glass ribbon 103 within the severing zone 134. As shown in FIG. 2, the nozzle 142 can received pressurized fluid, such as gas, from a fluid source 136 by way of a fluid manifold 138 configured to be controlled by the controller 195.

Figure 12:
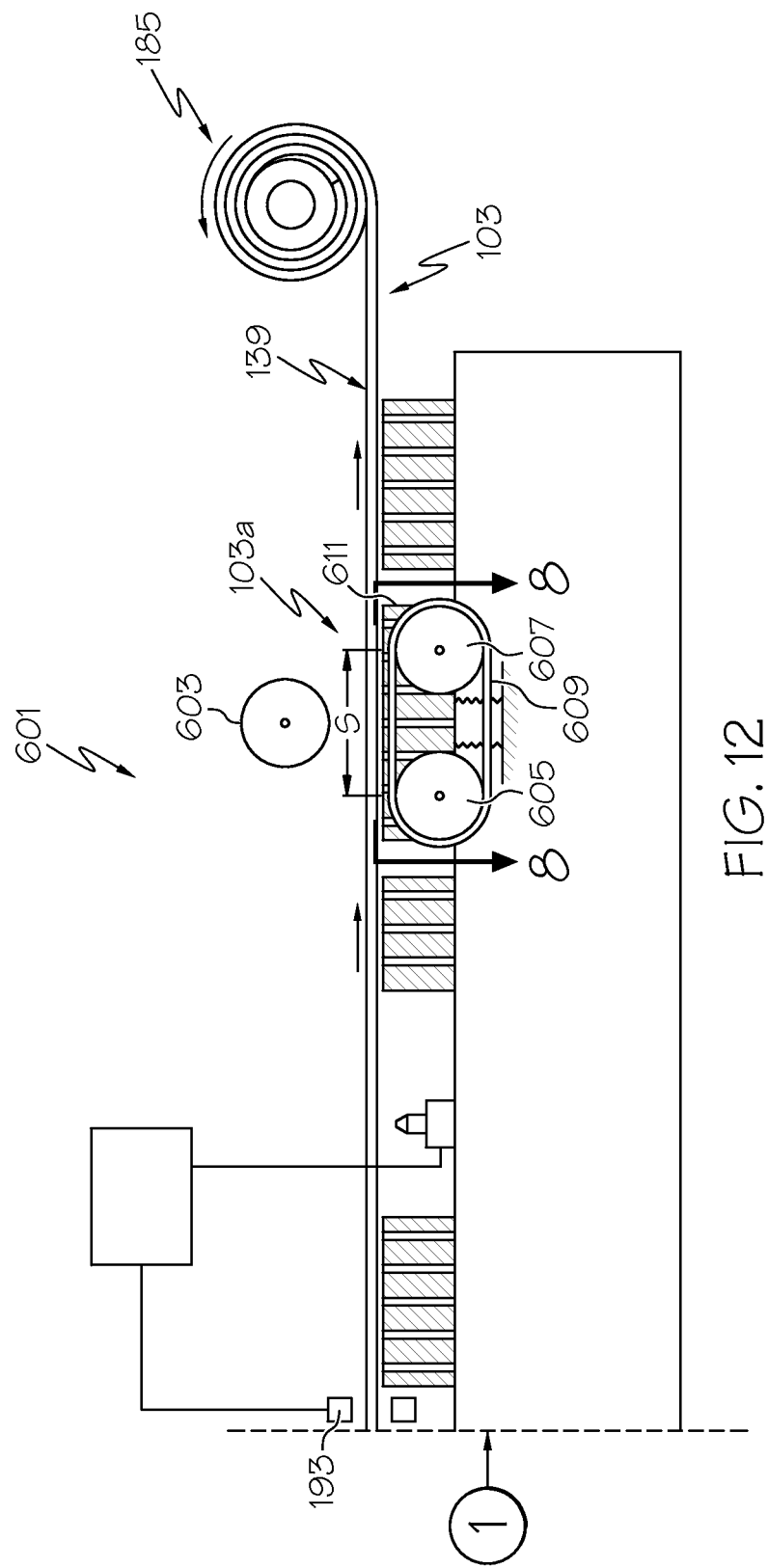
FIG. 12 is a schematic view of another example apparatus for severing a glass ribbon.

FIG. 12 illustrates yet another example of an apparatus 601 for severing the glass ribbon 103. The apparatus 601 can include at least a first roller 603 configured to apply a force to the second side 139 of the glass ribbon 103. The apparatus 601 can further include a second roller 605 and a third roller 607 spaced from the second roller along a support width "S." The first roller 603 applies the force to the second side 139 of the glass ribbon 103 along the support width "S" defined between the second roller 605 and the third roller 607. Optionally, an endless belt 609 can be configured to rotate with the second roller 605 and the third roller 607. For example, the endless belt 609 can be mounted with the second roller 605 acting as one end roller and the third roller 607 acting as the second end roller, wherein the rollers can be biased away from each other to help maintain the endless belt 609 in tension.

As further shown in FIG. 12, the apparatus 601 can include a support member 611 that may support the portion 103a of the glass ribbon in the first orientation shown in FIG. 12. In one example, the support member can include passages to transfer fluid, such as gas, through the passages to support the portion 103a of the glass ribbon with a liquid (e.g., gas) cushion generated between the first side 141 and the support member 611.

Figure 13:
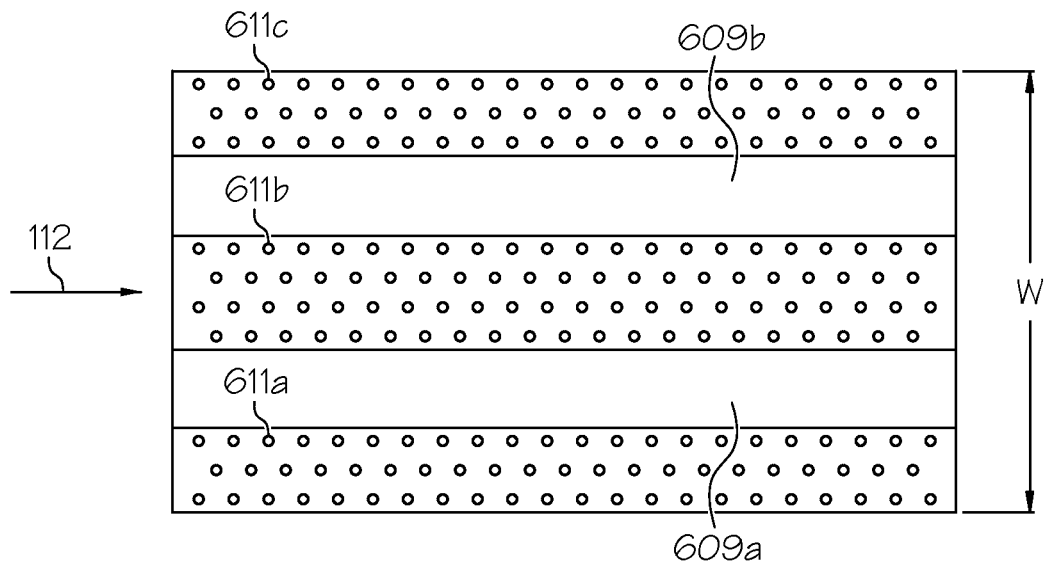
FIG. 13 is a sectional view along line 13-13 of FIG. 12.

In one example, there may be a plurality of support members 611 offset relative to one another along the width "W" of the support member extending transverse to the travel direction 112. For example, as shown in FIG. 13, the support member 611 comprises three spaced support members 611a, 611b, 611c spaced from one another. Likewise, in such examples, a plurality of endless belts may be provided between each of the spaced support members. For example, as shown in FIG. 13, the endless belt 609 includes a first endless belt 609a positioned between adjacent support members 611a, 611b and a second endless belt 609b positioned between adjacent support members 611b, 611c. As such, the portion 103a of the glass ribbon 103 may be adequately supported in the first orientation shown in FIGS. 12 and 14 (i.e., by the fluid cushion) and the bent orientation shown in FIGS. 15 and 16.

Figure 7:
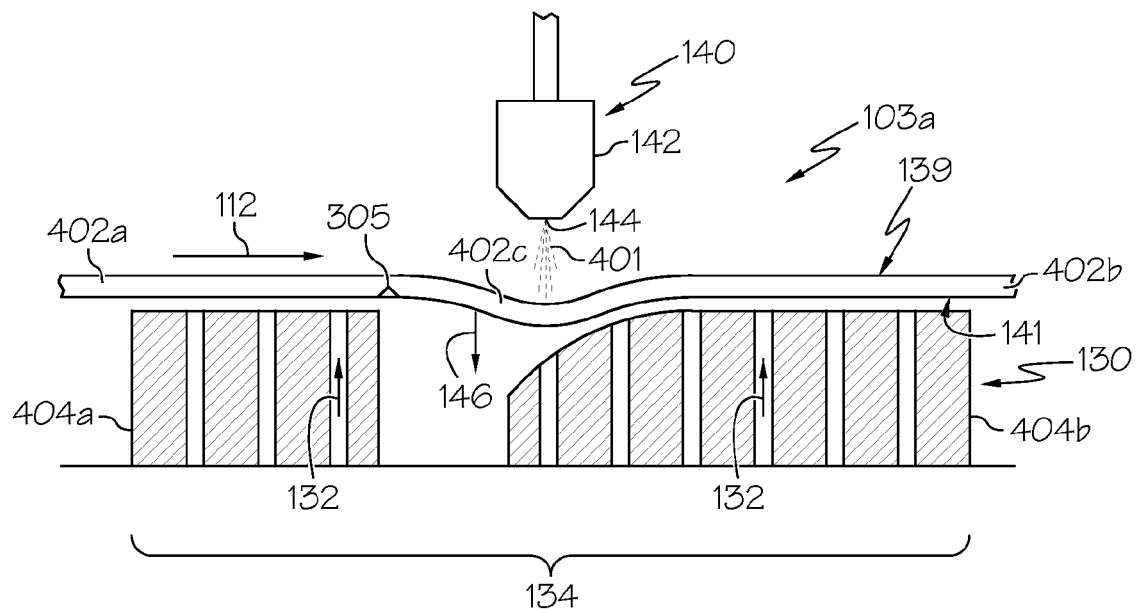
FIG. 7 is a view similar to FIG. 6 with a force being applied to the second side of the glass ribbon to bend a target segment of the glass ribbon.
Figure 8:
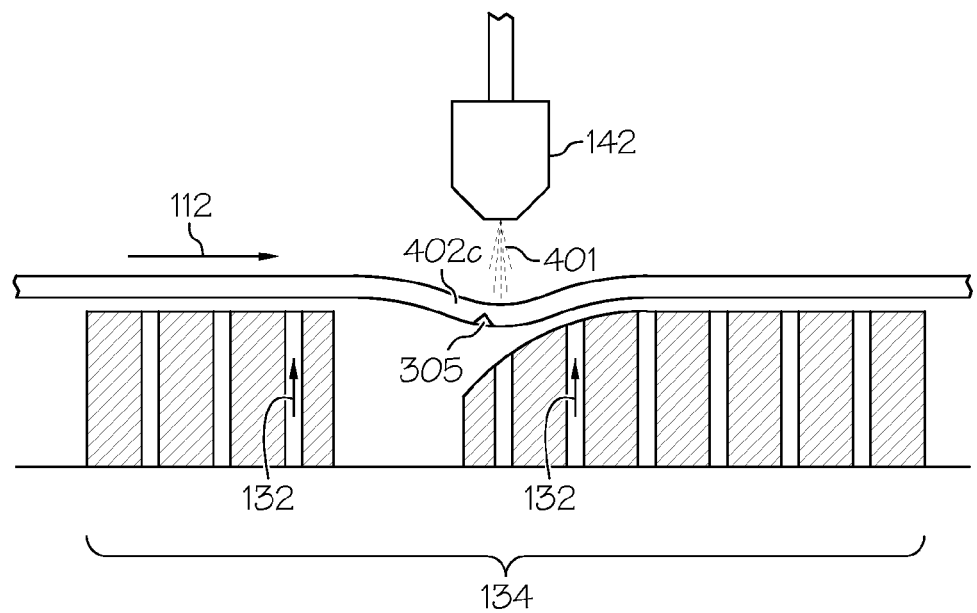
FIG. 8 is another view similar to FIG. 7 with the predetermined flaw approaching a severing position.
Figure 9:
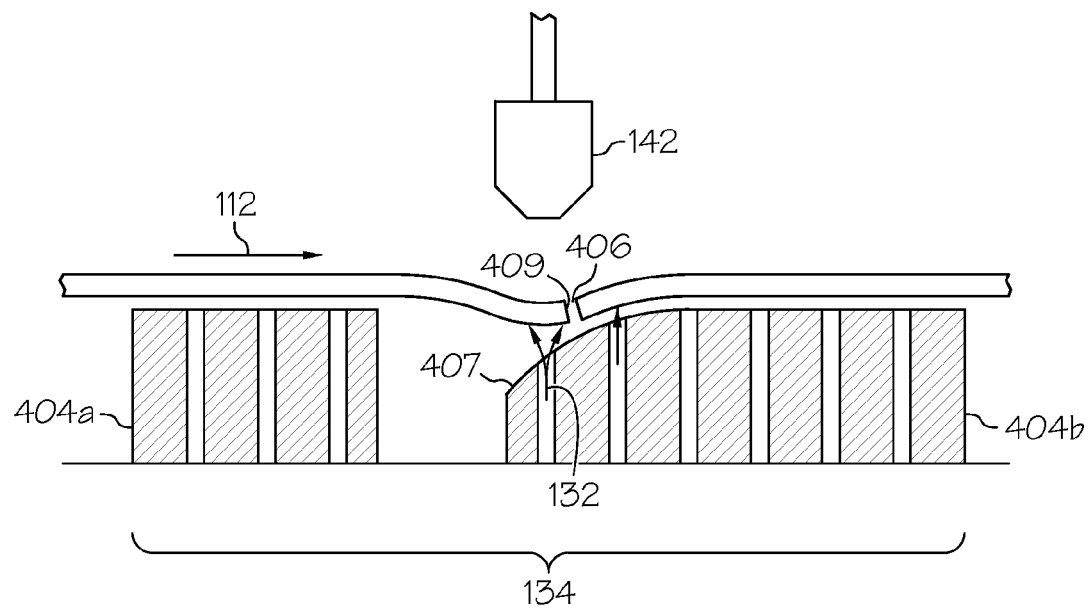
FIG. 9 illustrates the step of severing the central portion of the glass ribbon between opposed edge portions at the predetermined flaw located in the severing zone.

In yet another example, the apparatus for severing the glass ribbon may include an apparatus similar to FIGS. 6-10 but include at least one roller, rather than the fluid nozzle 142, configured to apply the force to the second side of the glass ribbon. In such an example, the roller (e.g., similar to the first roller 603 discussed above) can rotate while temporarily bending the portion of the glass ribbon in the direction toward the support member. As such, rather than the non-contact fluid nozzle 142, a contact roller may be provided that temporarily bends the portion of the glass ribbon in the direction toward the support member similar to that shown in FIGS. 7-9. At the same time, as shown in FIGS. 7-9 upstream and downstream support members can provide a contact-free support of the first side of the glass ribbon with corresponding fluid cushions provided by the support members.

Figure 11:
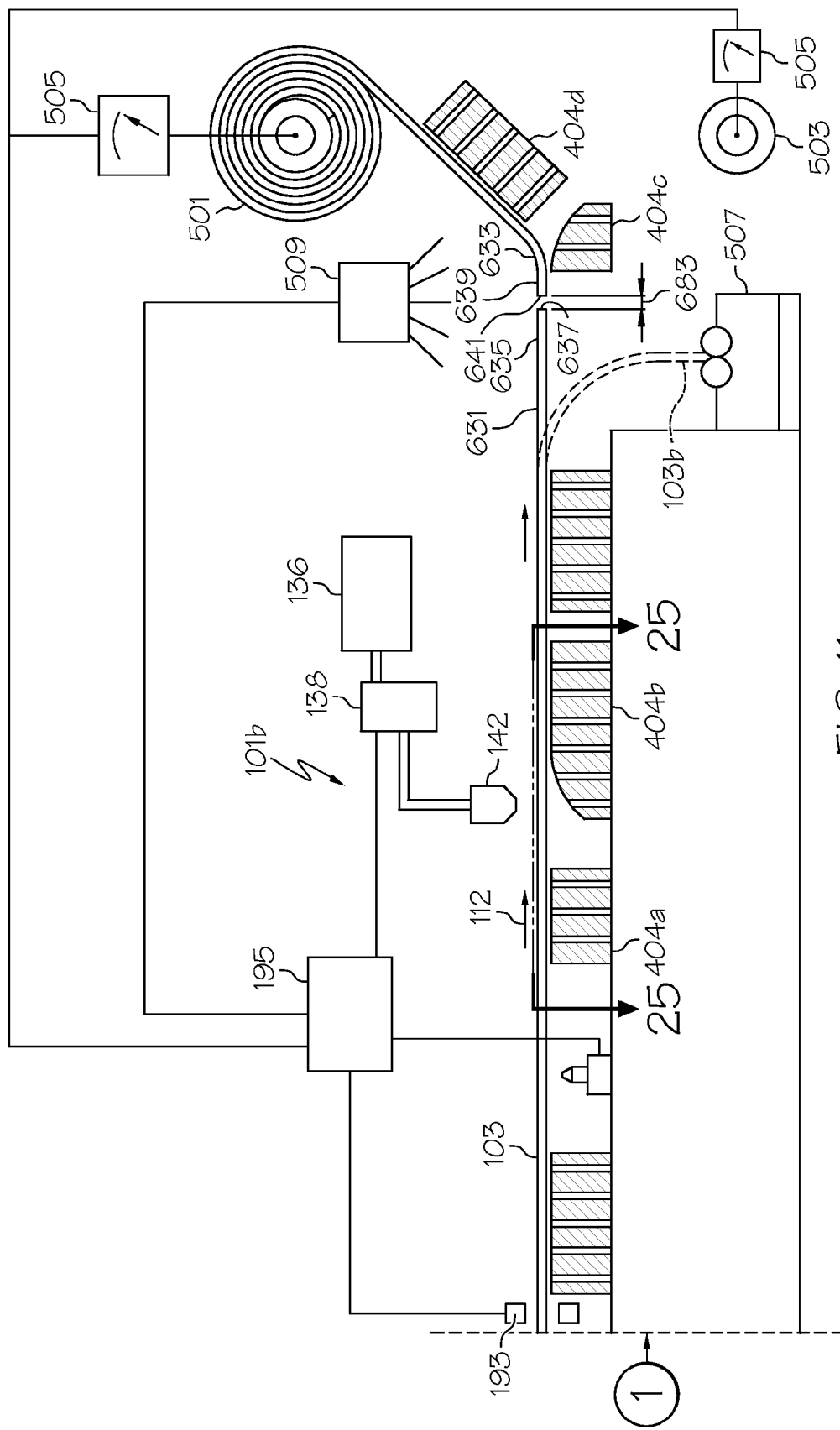
FIG. 11 a schematic illustration demonstrating the step of switching between a first storage roll and a second storage roll.

As described above, the glass ribbon 103 can be severed by any number of means. After the glass ribbon 103 is severed as shown in FIG. 11, the glass ribbon is separated into an upstream web 631 and a downstream web 633. The upstream web 631 comprises an upstream edge portion 635 including an upstream severed edge 637. The downstream web 633 comprises a downstream edge portion 639 including a downstream severed edge 641. It can be advantageous to create a gap 683 between the upstream web 631 and the downstream web 633. The gap 683 can help facilitate storage roll 501, 503 change without changing the process speed of the apparatus 101. Additionally, the gap 683 can also help reduce or eliminate damage to the glass ribbon 103 created by glass-to-glass contact between the downstream severed edge 637 and the upstream severed edge 641.

Processing glass substrates in sheet or roll form can include the use of a handling tabs 651, 653 (e.g., see FIG. 3) located on the glass ribbon 103 to aid in various processing steps. The handling tabs 651, 653 may be provided on the edge portions 201, 203. For instance, the handling tabs 651, 653 may have been previously applied and rolled into the spool 124. Such handling tabs 651, 653 may be provided, for example to help align the glass ribbon in the spool 124 and help space the pristine surfaces of the glass ribbon wound in the spool 124. FIG. 3 schematically illustrates the handling tabs 651, 653 adjacent the beads 207, 209 for illustration purposes. While the handling tabs 651, 653 may be provided on the beads, in addition or alternatively, the handling tabs may also be provided on the edges 223, 225 of the central section 205 of the glass ribbon 103 after the edge portions 201, 203 have been removed.

If provided, handling tabs 651, 653 can be placed on the glass ribbon to help reduce physical damage to the glass ribbon during handling. In another example, the handling tabs 651, 653 can help align layers of glass ribbon 103 within storage rolls 501, 503 (e.g., see FIG. 11) so that the edges of the roll remain aligned with respect to one another while spacing the pristine surfaces of the glass ribbon from one another as the glass ribbon 103 is rolled. In yet another example, the handling tabs 651, 653 can be configured to permit glass ribbon 103 location and manipulation without physical contact of one layer of the glass ribbon 103 with an adjacent layer of the glass ribbon within the storage roll 501, 503. Furthermore, the handling tabs 651, 653 can be removable.

Figure 25:
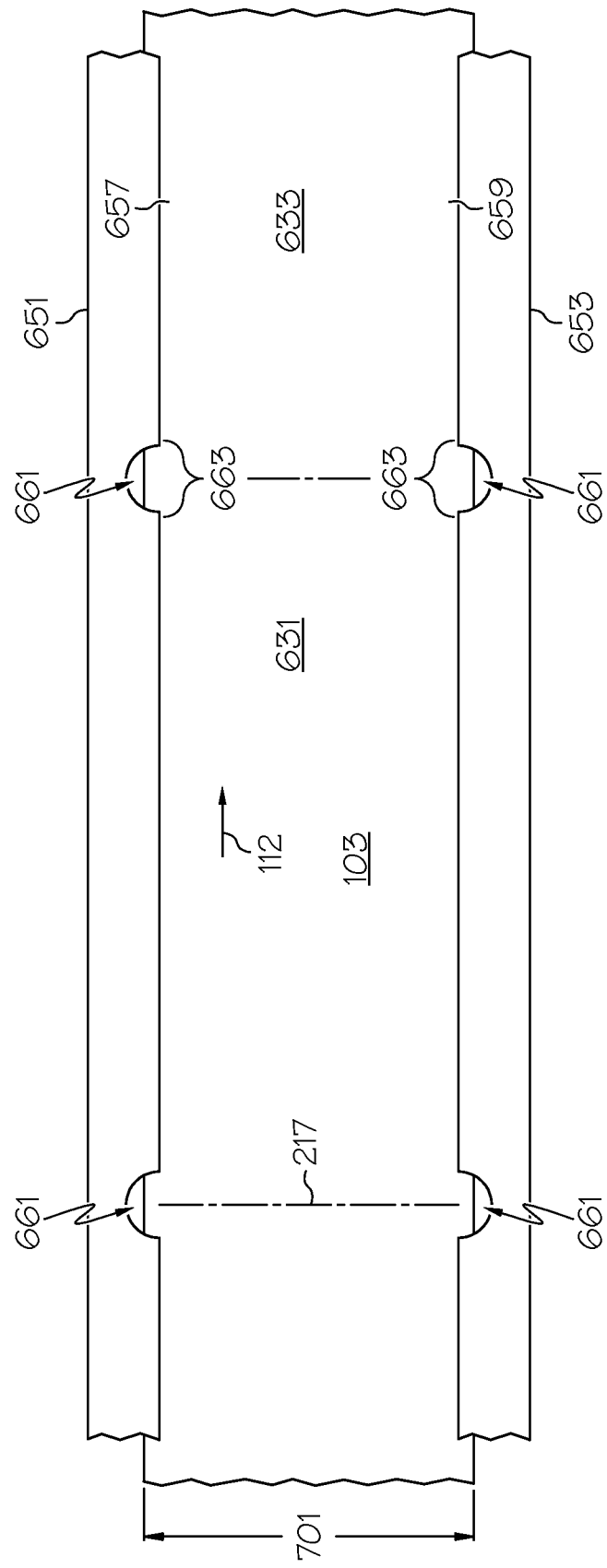
FIG. 25 is a sectional view along line 25-25 of FIG. 11.

As shown in FIG. 3 and mentioned previously, the handling tabs 651, 653 can be applied to the glass ribbon 103 prior to the optional step of edge separation. In addition or alternatively, the handling tabs 651, 653 can be applied to the glass ribbon 103 after the optional edge separation. In another example, the handling tabs 651, 653 can be applied to the glass ribbon 103 prior to being wound about glass ribbon source 105 (e.g., FIG. 1), remain applied to the glass ribbon through the glass ribbon severing process, and then be wound with the glass ribbon onto a storage roll 501, 503. In another example, the handling tabs 651, 653 can be applied to the upstream web 631 and the downstream web 633 after the glass ribbon has been severed. FIG. 25 illustrates a handling tab 651 attached to a first side edge 657 and a handling tab 653 attached to a second side edge 659. Further examples can include only one of the handling tabs 651, 653 attached to one of the first side edge 657 or the second side edge 659.

FIG. 25 shows one example of handling tabs 651, 653 located on the glass ribbon 103. Handling tab 651 is shown attached to the first side edge 657 and handling tab 653 is shown attached to the second side edge 659. Each of the handling tabs 651, 653 can include apertures 661 open at an interior edge of the handling tab to expose the entire width of the glass ribbon 103 across its width, i.e., parallel to the direction of axis 217, which can be substantially perpendicular to the travel direction 112 of the glass ribbon 103. Each of the apertures 661 can extend only partially across the handling tabs 651, 653, so that at least a portion of the handling tabs 651, 653 is continuous along the glass ribbon 103. The apertures 661 can be said to resemble "mouse holes" in their appearance with an opening at an interior edge of the handling tab to effectively reduce the transverse width of the tab across the apertures 661 to expose a target area 663. As previously described, the handling tabs 651, 653 can be applied to the upstream web 631 and the downstream web 633 after the glass ribbon has been severed. In this case, the apertures 661 are aligned with the sever line or resulting gap between the upstream web 631 and the downstream web 633. In another example, the handling tabs 651, 653 can be applied to the glass ribbon 103 prior to the severing operation. In this case, the apertures 661 allow the glass ribbon 103 to be severed across its entire width (e.g. in the target area 663) while maintaining a physical connection between the individual severed pieces of the glass ribbon 103. The handling tabs 651, 653 can be removed entirely or can be cut at the apertures 661 at a later time to enable separate processing of the upstream web 631 and the downstream web 633.

Figure 17:
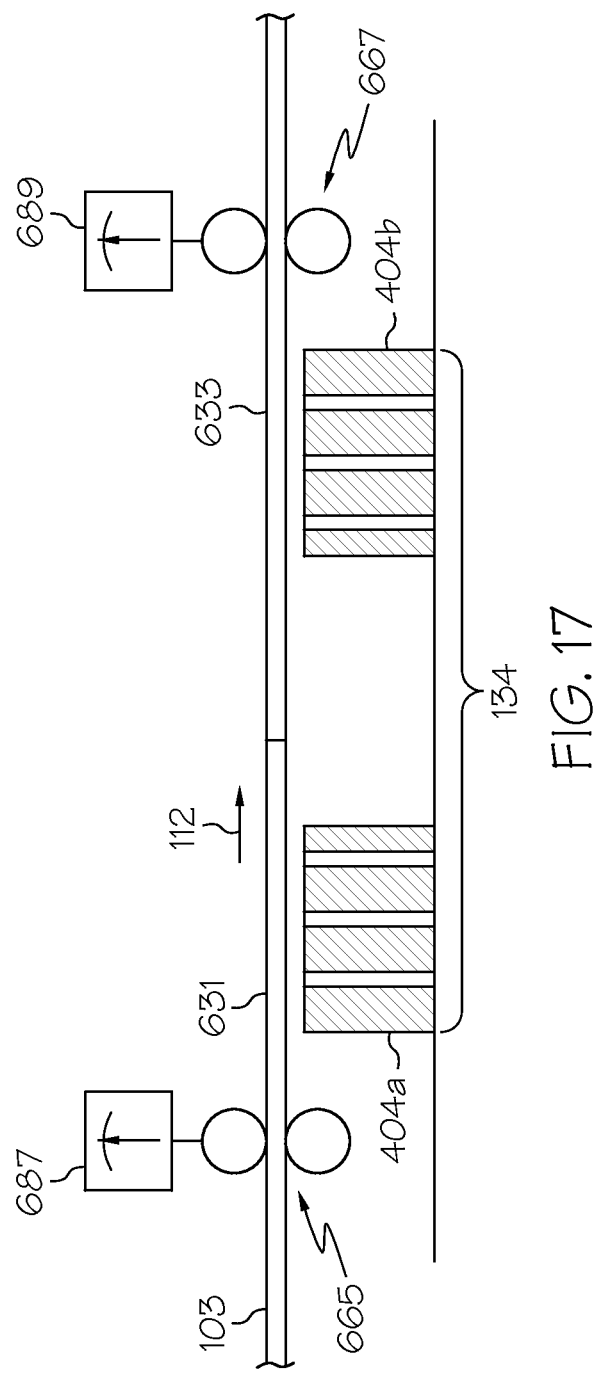
FIG. 17 is a view similar to FIG. 6 also showing pinch rolls and velocity indicators for each set of pinch rolls.

As shown in FIG. 17, the velocity of the glass ribbon 103 can be controlled by sets of powered pinch rolls 665, 667. It is to be appreciated that pinch rolls are but one example of mechanisms configured to control the velocity of the glass ribbon 103, and any mechanism as is known in the art can be used. In one example, a set of pinch rolls 665 can control the velocity of the upstream web 631, while another set of pinch rolls 667 can control the velocity of the downstream web 633. Of course, any number of sets of pinch rolls 665, 667 may be employed to control the velocity of the glass ribbon 103, and a controls system (not shown) can track which sets of pinch rolls 665, 667 are in contact with the upstream web 631 and the downstream web 633 in order to better control the glass ribbon 103 manufacturing process.

Figure 20:
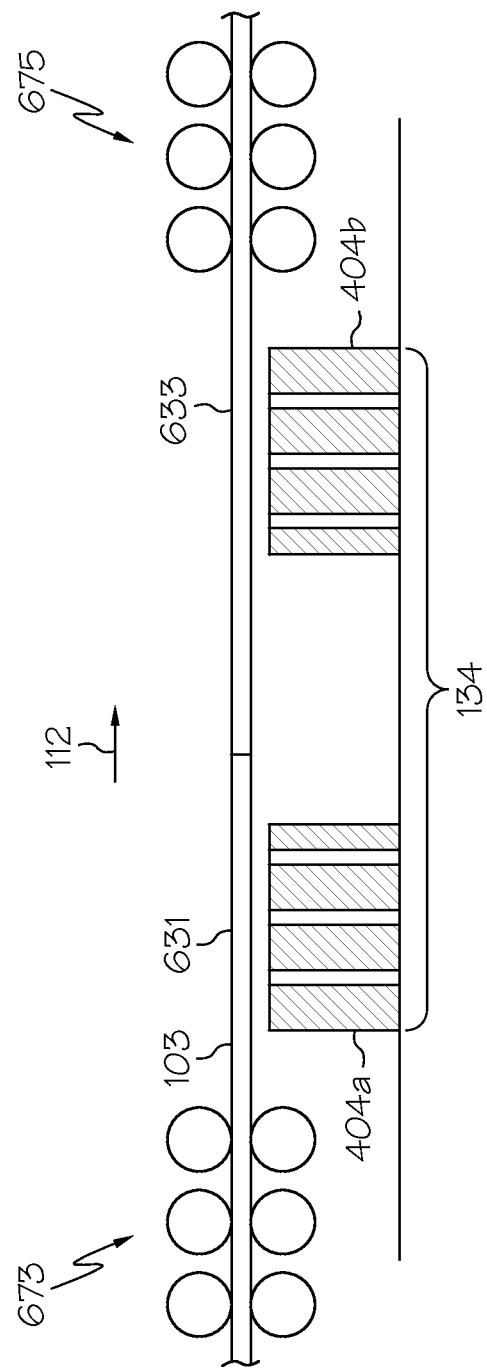
FIG. 20 is a view similar to FIG. 6 also showing glass ribbon accumulators for the upstream web and the downstream web.

FIG. 20 illustrates an additional device that can be used to control the velocity of at least a portion of the glass ribbon 103. For instance, the apparatus may include at least one accumulator such as an upstream accumulator and/or a downstream accumulator. For illustration purposes, FIG. 20 is a schematic representation of an upstream accumulator 673 and a downstream accumulator 675 although only one of the accumulators may be provided in further examples. The upstream accumulator 673 can be located on the upstream side of a severing zone 134, and the downstream accumulator 675 can be located on the downstream side of the severing zone 134. As a result, the upstream accumulator 673 and the downstream accumulator 675 can provide some control of the velocity of the upstream web 631 and the downstream web 633, respectively, by varying the path length of the upstream web 631 and the downstream web 633 as will be described below. As shown, the accumulators 673, 675 may comprise rollers that can selectively increase the travel path of portions of the glass ribbon to selectively create a gap as described below. In the illustrated example, each accumulator 673, 675 includes six rollers although more or less rollers may be used in further examples. For instance, in one example, three rollers may be provided with two rollers located above the glass ribbon 103 (e.g., the outer two rollers of the three illustrated upper rollers) and a single roller located below the glass ribbon 103 (e.g., the center roller of the three illustrated lower rollers). While rollers are shown, further examples can include expanding air bars or other structures configured to selectively increase the travel path of portions of the glass ribbon to likewise create a gap during processing.

Methods of fabricating the glass ribbon 103 with the apparatus 101 that creates a gap between an upstream severed edge and a downstream severed edge will now be described. As shown, in one example, the method can include use of the edge separation apparatus 101a shown in FIG. 1. In addition or alternatively, the method can use an apparatus for severing the glass ribbon (e.g., see apparatus 101b in FIG. 2 or apparatus 601 in FIG. 12, for example).

Turning to the example edge separation apparatus 101a of FIG. 1, one example method can include the step of traversing the glass ribbon 103 in a downward direction 121 relative to the source 105 through the downward zone 123. As shown, the glass ribbon 103 can travel substantially vertically in the downward direction 121 although the downward direction may be angled in further examples wherein the glass ribbon 103 can travel at an inclined orientation in the downward direction. Also, if the glass ribbon 103 is supplied on a spool such as 124, it may also traverse from the spool to the cutting unit in a substantially horizontal direction. For example, the coiled spool 124 and cutting zone may exist in nearly the same horizontal plane. In further examples, the spool may be positioned below the horizontal travel plane and unwound horizontally or upwardly to traverse along travel direction 112. Similarly, if other methods of making the ribbon are used, for example a float process or an up-draw process, the ribbon may travel in a horizontal, or upward direction as it travels from the forming source to the cutting unit and/or cutting zone.

The method can further include the step of bending the glass ribbon 103 in the bending zone 125 downstream from the downward zone 123, wherein the glass ribbon 103 includes the upwardly concave surface 127 through the bending zone 125. As shown, the lower portion 137 can be significantly lower than the bent target segment 151 in the cutting zone 147 although the lower portion 137 may be at substantially the same elevation or even higher than the bent target segment in further examples. Providing the lower portion 137 at a significantly lower position, as shown, can develop a predetermined amount of accumulated glass ribbon prior to engaging the support members (e.g., support member 135) of the edge separation apparatus 101a. As such, vibrations or other disturbances upstream from the lower portion 137 may be absorbed by the accumulated glass ribbon within the bending zone. Moreover, the glass ribbon 103 may be drawn at a substantially constant or desired predetermined rate as it passes through the cutting zone 147 independent of how fast the glass ribbon 103 is being fed into the downward zone 123 by the source 105. As such, providing an accumulation within the bending zone 125 can allow for further stabilization of the glass ribbon 103 within the cutting zone 147 while also allowing the glass ribbon 103 to be passed through the cutting zone 147 at a substantially constant or predetermined rate.

If provided, various techniques may be used to help maintain a desired accumulation of glass ribbon 103 within the bending zone 125. For example, a proximity sensor 129 or other device may be able to sense a position of the accumulated ribbon to adjust the rate at which glass ribbon is fed into the downward zone 123 by the source 105 to provide the appropriate accumulation of glass ribbon 103.

In further examples, the method can further include the step of bending the glass ribbon 103 downstream from the bending zone 125 to redirect the glass ribbon to travel in the travel direction 112. As shown, the bending support member 135 may comprise a bent air bar designed to effect the desired change of direction without contacting the central portion 205 of the glass ribbon 103. Furthermore, the method can also include the optional step of orienting the glass ribbon 103 being bent with the bending support member with the lateral guides 143, 145 to help orient the glass ribbon 103 in the correct lateral position relative to the travel direction 112 of the glass ribbon 103.

The method can also include the step of traversing the glass ribbon 103 into the cutting zone 147 downstream from the bending zone 125 and then bending the glass ribbon 103 in the cutting zone 147 to provide the bent target segment 151 with a bent orientation in the cutting zone 147.

As shown in FIG. 1, the glass ribbon 103 can be bent such that the bent orientation of the target segment 151 includes the upwardly facing convex surface. In one example, the method can include the step of supporting the bent target segment 151 with the cutting support member 149 comprising the illustrated curved air bar. As shown, the cutting support member 149 can include an upwardly facing convex support surface 152 configured to bend the target segment 151 to establish the upwardly facing convex surface.

As shown in FIG. 1, the method can further include the step of severing at least one of the edge portions 201, 203 from the central portion 205 of the bent target segment 151 within the cutting zone 147. As shown in FIG. 3, the examples of the disclosure can include severing both of the edge portions 201, 203 from the central portion 205 although a single edge portion may be severed from the central portion in further examples. Moreover, as shown in FIG. 3, both of the edge portions 201, 203 are severed simultaneously from the central portion 205 although one of the edge portions may be severed before the other edge portion in further examples.

The glass ribbon 103 may include edge beads 207, 209. Alternatively, the glass ribbon 103 may have edge portions 201, 203 that are free from substantial edge beads or features. For example, the edge beads 207, 209 may have been already removed in a previous cutting process or the glass ribbon 103 may have been formed without significant edge bead features. Also, the included figures indicate that the separated edge portions 201, 203 are disposed of or recycled. In another example, the separated edge portions form useable glass ribbon in addition to the central portion 205 and can likewise be either cut into sheets or spooled as product. In this case, multiple cutting operations can exist across the glass ribbon width is it traverses through the cutting unit.

The step of severing can incorporate a wide range of techniques. For example, the edge portions 201, 203 can be severed from the central portion 205 by way of the glass cutting device 153 that can include the illustrated optical delivery apparatus 155 and the coolant fluid delivery apparatus 159.

One example of initiating the severing process can use a scribe or other mechanical device to create an initial defect (e.g., crack, scratch, chip, or other defect) or other surface defect at the site where the glass ribbon is to be severed. The scribe can include a tip although an edge blade or other scribe technique may be used in further examples. Still further, the initial defect or other surface imperfection may be formed by etching, laser impact, or other techniques. The initial defect may be created at the edge of the ribbon or at an inboard location on the ribbon surface.

The initial defect or surface imperfection can be initially formed adjacent a leading edge of the glass ribbon 103 traversing in the travel direction 112. As shown in FIG. 3, the elongated radiation zone 227 may be formed on the upwardly facing convex surface. As the elongated radiation zone 227 is elongated in the travel direction 112, the radiation heats the region in proximity to the initial defect. The coolant jet 180 then contacts the cooling zone 229 to generate a crack at the initial defect that completely travels through the thickness "$T_2$" of the glass ribbon 103 due to the created tensile stress to sever the corresponding edge portions 201, 203 from the central portion 205.

The severed opposed edge portions 201, 203 can be effectively removed while leaving the central portion 205 with high quality opposed edges 223, 225 with reduced internal stress profiles, reduced cracks, or other imperfections in the opposed edges 223, 225. As such, the central portion 205 can be bent, such as wound in the storage roll 185 without cracking that may otherwise occur with reduced quality edges. Moreover, the higher quality edges can avoid scratching the central portion 205 during coiling that might otherwise occur with edge portions including glass shards or other imperfections. In addition, the edge portions 201, 203 can likewise be optionally wound on a spool for use in different applications.

The method can further include the step of supporting the bent target segment 151 with the upwardly facing convex surface 152 of the cutting support member 149. For instance, the bent target segment 151 can be supported by the convex surface 152 of the illustrated air bar while severing the edge portions 201, 203 from the central portion 205 of the bent target segment 151 within the cutting zone 147.

The method can still further include the step of coiling the central portion 205 of the glass ribbon 103 into the storage roll 185 after the step of severing. As such, the high quality central portion 205 of the glass ribbon may be efficiently coiled into a storage roll 185 for subsequent shipping or processing into glass sheets. As shown in FIGS. 1 and 3, the severed edge portion 201, 203 can be disposed of in a glass ribbon chopper 183 although alternative methodologies may be employed to use the edge portions for other applications. In such examples, one or both of the severed edge portions 201, 203 may be stored on corresponding storage rolls for subsequent processing.

Example methods of severing a glass ribbon 103 across its width, i.e., parallel to the direction of axis 217 will now be described. As shown, the method can begin with providing the source 105 of the glass ribbon 103 with a pair of edge portions 201, 203 that may or may not include the beads 207, 209. Optionally, the edge portions 201, 203 may be severed by way of the procedure discussed above although the edge portions may not be removed in further examples.

As shown, the central portion 205 of the glass ribbon 103 includes a first side 141 facing a first direction and a second side 139 facing a second direction opposite the first direction. In one example, the apparatus 101 can sense the amount of glass ribbon that has been coiled on the storage roll 185 and/or sense a characteristic of the glass ribbon 103 with the monitoring device 193.

If it is determined the glass ribbon should be severed across its width, the controller 195 can activate the device 197, such as the illustrated scribe or other mechanical device, to create an initial defect (e.g., crack, scratch, chip, or other defect) with the point of the scribe to create a controlled and predetermined surface defect at the site where the glass ribbon is to be severed. The scribe can include a tip although an edge blade or other scribe technique may be used in further examples. Still further, the initial defect or other surface imperfection may be formed by etching, laser impact, or other techniques. The initial defect may be created at the edge of the ribbon or at an inboard location on the ribbon surface at a point along the width of the ribbon. In one example, the predetermined surface defect comprises a predetermined flaw that is generated by the device 197.

FIG. 4 illustrates the tip 301 engaging the first side 141 and moving in direction 303 to create the predetermined flaw 305 shown in FIG. 5. As shown, in one example, the predetermine flaw 305 can be generated as a linear segment having a length substantially less than a width of the central portion of the glass ribbon defined between the pair of opposed edge portions. In addition or alternatively, the predetermined flaw 305 can be generated as a linear segment extending in a direction of a width of the central portion 205 of the glass ribbon 103 defined between the pair of opposed edge portions. Although not shown, the predetermined flaw 305 can extend across a substantial portion, such as the entire width of the central portion 205. However, as the glass ribbon 103 continues to move in travel direction 112, a relatively small segment may be desired to provide a linear segment to control proper severing of the glass ribbon along the width.

FIG. 6 illustrates the portion 103a of the glass ribbon 103 including the predetermined flaw 305 traversing to the severing zone 134 downstream from the source 105 of the glass ribbon 103. As further shown, fluid 132 being emitted from the support member 130 impacts the first side 141 of the glass ribbon 103 to at least partially support a weight of the portion of glass ribbon within the severing zone 134 while maintaining the portion of the glass ribbon in the first orientation. As shown in FIG. 6, the first orientation can substantially provide the glass ribbon along a planar orientation that may be substantially parallel to the travel direction 112.

FIG. 7 illustrates the predetermined flaw 305 being traversed farther downstream along travel direction 112 wherein the portion 103a of the glass ribbon 103 is temporarily bent in the direction 146 toward the support member 130. The portion 103a can be temporarily bent, for example, by applying a force to the second side 139 of the glass ribbon 103. In one example, a roller may be used to apply a force to the second side 139 of the glass ribbon. Alternatively, as shown, applying the force can be achieved by impacting the second side 139 of the glass ribbon 103 with fluid 401 emitting from the orifice 144 of the nozzle 142. Using a fluid to bend the glass ribbon can be desirable to prevent scratching or otherwise damaging the glass ribbon that may otherwise occur with mechanical contact configurations.

As shown, the portion 103a includes two parallel parts 402a, 402b that extend along the same plane although the two parts 402a, 402b may not be parallel in further examples and/or may extend along different planes. As shown, the orientation of the parts 402a, 402b can be oriented by supporting them with a support member 130. More particularly, the first part 402a can be supported by an upstream support member 404a, and the second part 402b can be supported by a downstream support member 404b. For instance, as shown the support members 404a, 404b can comprise air bars configured to emit fluid 132, such as gas, to provide respective air cushions. Indeed, the upstream support member 404a can place a first support air cushion between the upstream support member 404a and the first part 402a of the portion 103a of glass ribbon 103. Likewise, the downstream support member 404b can place a second support air cushion between the downstream support member 404b and the second part 402b of the portion 103a of glass ribbon 103. As such, impacting the first side 141 of the glass ribbon 103 with fluid emitting from each of the upstream support member 404a and the downstream support member 404b can provide respective gas cushions that at least partially support a weight of the portion 103a of glass ribbon 103 at respective upstream and downstream positions. Providing support with corresponding air cushions can help position the glass ribbon 103 for severing without touching the pristine surfaces of the glass ribbon. As such, scratching or other damage to the pristine surfaces can be avoided.

As further illustrated in FIG. 7, the portion 103a of the glass ribbon 103 includes a target segment 402c that can be defined between the upstream support member 404a and the downstream support member 404b. As shown in FIG. 6, the upstream support member 404a and the downstream support member 404b can maintain the target segment 402c of the glass ribbon 103 in the first orientation within the severing zone 134. Moreover, as shown, at least a portion of the target segment 402c can be substantially free from support by the gas cushions of the support members 404a, 404b.

As shown in FIG. 7, the method can further include the step of temporarily bending the target segment 402c of the glass ribbon 103 in the direction 146 toward the support member 130 from the first orientation to a severing orientation with a force generated by impacting the second side 139 of the glass ribbon 103 with fluid 401 emitting from the fluid nozzle 142. Optionally, the method can include the step of increasing the rate that fluid is being emitted from at least one of the support members 404a, 404b, such as both support members, to at least partially counteract the force generated by impacting the second side of the glass ribbon with fluid emitting from the fluid nozzle.

Once bent, the second side 139 has an upwardly concave portion provided between the two parts 402a, 402b of the portion 103a of glass ribbon 103. As such, the lower side of the target segment 402c is placed in tension. FIG. 8 shows the portion 103a further traversing in travel direction 112 such that the predetermined flaw 305 enters in the target segment 402c and is placed in tension. FIG. 9 demonstrates the step of severing the central portion 205 of the glass ribbon 103 between the opposed edge portions at the predetermined flaw 305 located within the severing zone 134. As can be seen from FIGS. 7 and 8, the upwardly concave portion is provided downstream of the predetermined flaw 305. Then, as the glass ribbon 103 travels in the travel direction 112, the predetermined flaw 305 travels to the upwardly concave portion, and as it travels through that upwardly concave portion, the ribbon 103 is severed across its width at the point of the predetermined flaw 305. It would be difficult, on a traveling ribbon, to form an upwardly concave portion exactly at the predetermined flaw. Accordingly, forming the upwardly concave portion first, and allowing the flaw to travel to that portion facilitates severing the ribbon across its width. Additionally, or alternatively, forming the upwardly concave portion in the severing zone 134 and allowing the flaw to travel to the upwardly concave portion eliminates the need for a separate accumulator or stoppage of the ribbon 103 in order to sever the ribbon 103 across its width.

If there are any constraints in the travel direction 112 upon the motion of the glass ribbon 103, they can be controlled during the severing process to allow formation of the curvature that places the lower side of the target segment 402c in tension. If, for example, a set of driven pinch rolls were located near the lateral guides 143, 145, in FIG. 3, the length of the center section 205 may be influenced. In order to assist bending the glass ribbon 103, relative speed in the travel direction 112 between the driven pinch rolls and the downstream takeup device (ex. central core 187 in FIG. 2) can allow for a slight accumulation of length within the severing zone 134.

In addition, the apparatus may include a mechanism to facilitate movement of the glass ribbon along the travel direction 112. For example, in some embodiments, the central core 187 may be driven to rotate to help facilitate movement of the glass ribbon 103 along the travel direction 112. In addition, or alternatively, a set of drive rollers may facilitate movement of the glass ribbon. Providing a set of drive rollers, for example, can help facilitate movement of the glass ribbon together with the severed end 409 that is no longer connected to the central core 187 after severing. As such, the drive rollers can continue to move the severed end 409 along to be wound on to another central core 187 after switching the storage rolls. The drive rollers can be provided at various locations. For instance, the lateral guides 143, 145 may be provided as driven rollers to help drive the glass ribbon along the travel direction 112 although the driven rollers may be provided at alternative locations in further examples.

Figure 10:
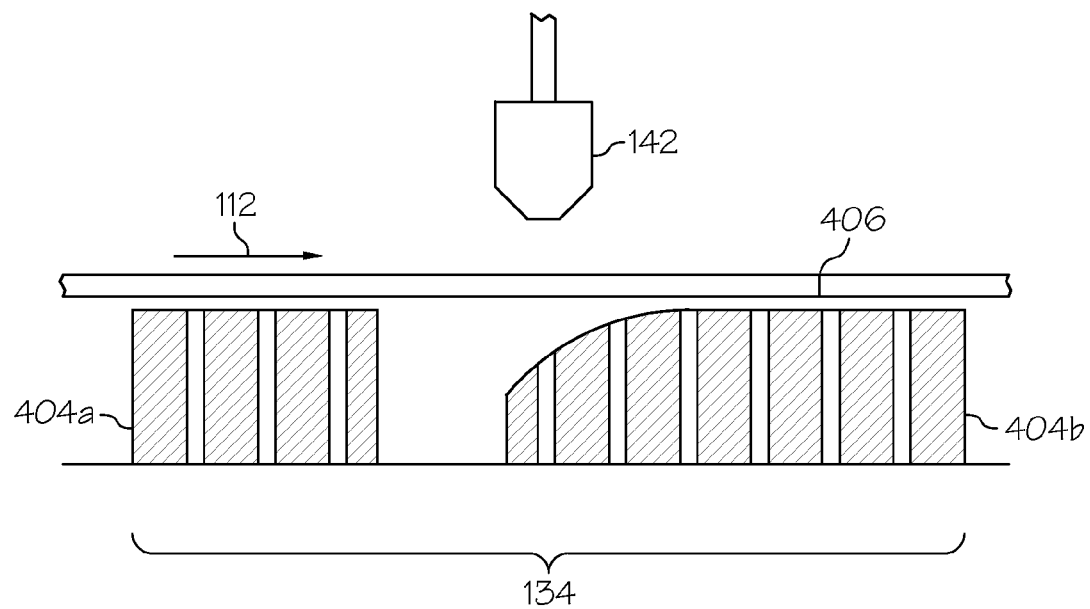
FIG. 10 illustrates the portion of the glass ribbon being returned to the first orientation.

FIGS. 9 and 10 demonstrate the step of returning the target segment 402c of the glass ribbon 103 to the first orientation by removing the force being applied by the fluid nozzle 142. For example, once the flow of fluid from the nozzle is stopped, the flow of fluid from the support member 130 can act against the glass ribbon to restore the glass ribbon to the first orientation, particularly as the severed area 406 travels up into a linear support region of the second support member 404b. As shown, the downstream support member 404b can include a leading end with a convex support surface 407. The convex support surface 407, if provided, can inhibit obstruction of the severed end 409 of the glass ribbon 103 after the step of severing.

FIG. 12 illustrates another apparatus 601 wherein the first roller 603 is designed to provide the force to bend the glass ribbon. Providing a roller that rotates can minimize friction and damage to the surface that will likely occur due to the necessary mechanical engagement between the roller and the glass ribbon. Alternatively, driving the first roller 603 to match the speed of the glass ribbon 103 can further reduce friction and damage to the surface. The first roller 603 can bend the glass ribbon temporarily, thereby minimizing the length of glass ribbon that is contacted by the roller. As such, the first roller 603 may only be temporarily moved to bend the glass ribbon shortly before or substantially when the severing is to occur.

Figure 14:
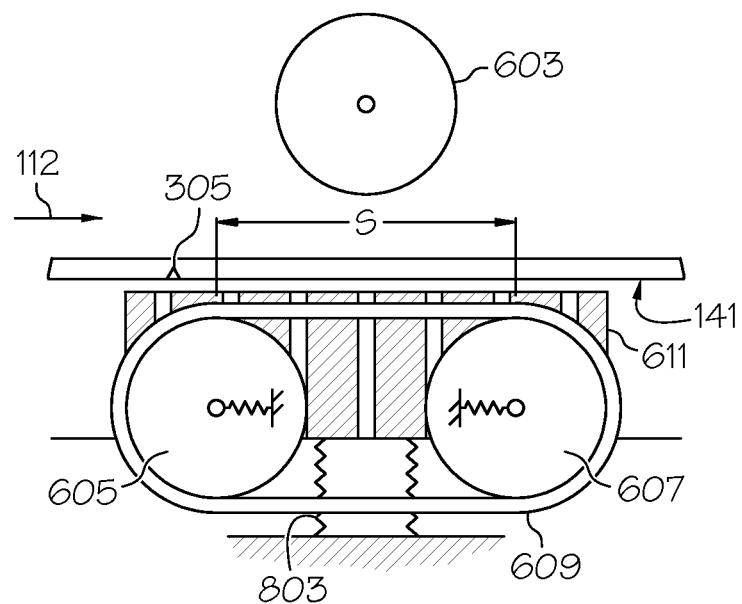
FIG. 14 is an enlarged view of the apparatus for severing a glass ribbon from FIG. 12 with the target segment in a first orientation.

FIG. 14 shows the predetermined flaw 305 approaching the severing zone 134 wherein the portion 103a of the glass ribbon 103 including the predetermined flaw 305 in the first orientation. This orientation may be maintained, for example, by the support member 611 configured to emit fluid to contact the first side 141 to provide a support cushion.

Figure 15:
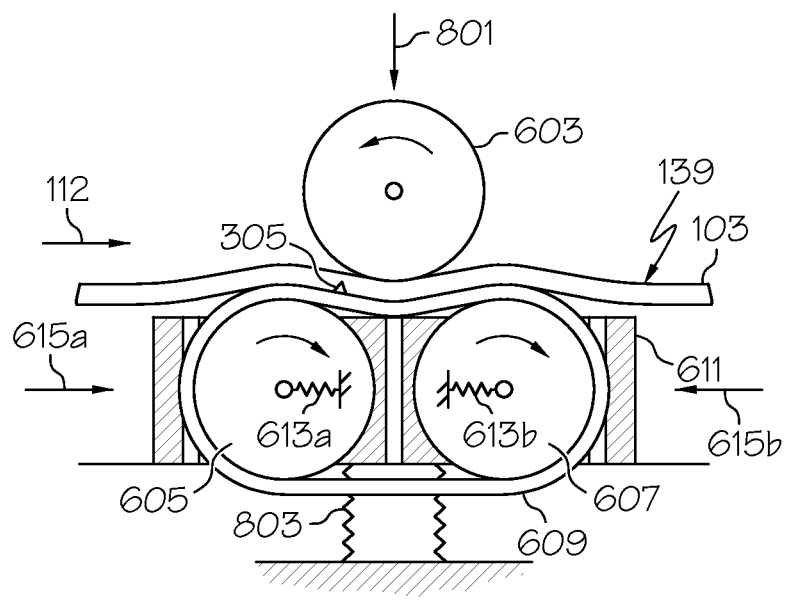
FIG. 15 is similar to FIG. 14 with the target segment in a bent orientation.

FIG. 15 shows the roller 603 being moved in direction 801 to apply a force to the second side 139 of the glass ribbon 103. As shown, the roller 603 rotates while temporarily bending the portion of the glass ribbon in the direction 801 toward the support member 611. In some examples, the air cushion generated by the support member 611 can cause the support member 611 to act against the bias of springs 803 and move in the direction 801 to avoid contacting the glass ribbon 103. As shown in FIG. 13, three spaced support members 611*a*, 611*b*, 611*c* can, in some examples, be independently supported such that the support members 611*a*, 611*b*, 611*c* can each move downward to avoid contacting the glass ribbon when bending the glass ribbon with the roller 603.

As further shown in FIG. 15, once the roller 603 is moved in direction 801, the first side 141 of the glass ribbon 103 can be supported with the second roller 605 and the third roller 607. Indeed, the first side 141 of the glass ribbon 103 can be supported along the support width "S". As shown, the first roller 603 applies the force to the second side 139 of the glass ribbon 103 along the support width "S" defined between the second roller 605 and the third roller 607. As such, a three point bending configuration may be provided to help bend the ribbon traversing along travel direction 112 through a bend similar to the bend illustrated in FIGS. 7 and 8.

Optionally, the endless belt 609 can be provided to rotate with the second roller 605 and the third roller 607 and the endless belt 609 temporarily engages the first side 141 of the glass ribbon 103. Providing the endless belt 609 can help support the portion 103*a* of the glass ribbon 103 as it traverses through the bend. Moreover, the endless belt 609 can help redirect the severed area 406 through the bend and ultimately back to the first orientation shown in FIG. 14.

Figure 16:
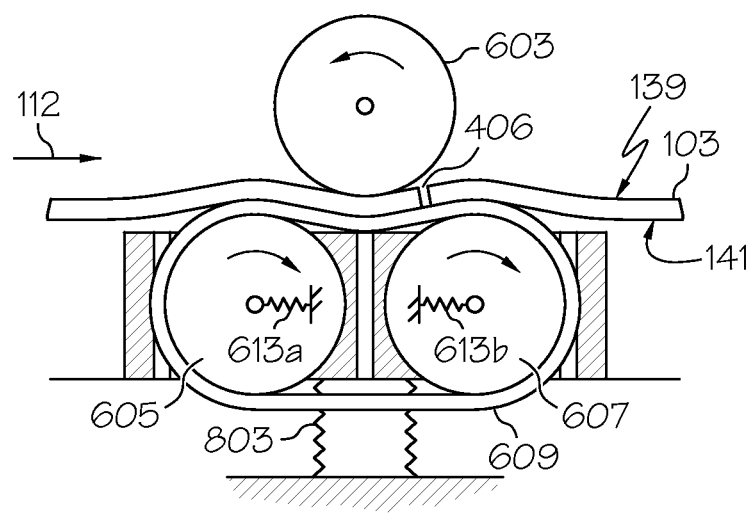
FIG. 16 is similar to FIG. 15 with the target segment in the bent orientation and the glass ribbon being severed at the predetermined flaw located in the severing zone.

As shown in FIG. 13, the endless belt 609 can comprise two or more belts 609*a*, 609*b* to provide adequate support across the width "W" of the glass ribbon 103. Pressing the first roller 603 in direction 801 consequently bends the travel path of the endless belt 609 as shown in FIGS. 15 and 16. The belt can be substantially flexible and resilient to allow the belt to stretch to accommodate the increased overall belt length resulting from the bent travel path if the second and third rollers 605, 607 remain at the same spacing relative to one another. Alternatively, as shown, the second and third rollers 605, 607 may be provided with corresponding springs 613*a*, 613*b* that allow the second and third rollers 605, 607 to be biased together, against the force of the springs, in corresponding directions 615*a*, 615*b*. In such an example, the overall length of the endless belt 609 may remain substantially the same, wherein the second and third rollers 605, 607 move toward each other to accommodate the bend of the travel path.

Once the portion 103*a* of the glass ribbon 103 is severed along the predetermined flaw 305, the first roller 603 can be retracted such that the first, second and third rollers do not apply a force to the glass ribbon and the gas cushions from the support member 611 can again maintain the portion of the glass ribbon in the first orientation as shown in FIG. 14. Consequently, the springs 613*a*, 613*b*, if provided, can bias the second and third rollers 605, 607 away from one another such that the upper segment of the endless belt again achieves the linear profile illustrated in FIG. 14. Moreover, as the portion 103*a* is repositioned from the bent orientation to the first orientation, the springs 803 again bias the portion 103*a* to be positioned above, and out of contact with the endless belt 609. As such, as shown in FIG. 14, the endless belt 609 does not engage the glass ribbon 103 in the first orientation. Rather, the air cushion provided by the support member 611 can be designed to provide the necessary support to the glass ribbon to maintain the first orientation.

It will therefore be appreciated that the roller 603 can provide temporary bending of the portion 103*a* of the glass ribbon including the predetermined flaw 305 for a brief period of time. As such, bending can be achieved to the extent necessary to sever the glass ribbon at the predetermined flaw 305. Moreover, the first orientation may be achieved shortly after severing, wherein the glass ribbon is again supported without mechanically engaging objects that may otherwise scratch or otherwise damage the glass ribbon.

The method can also include steps to create a gap between an upstream severed edge and a downstream severed edge. One example method can increase a relative velocity of a downstream edge portion with respect to an upstream edge portion to create the gap between the upstream severed edge and the downstream severed edge. For illustration purposes, FIG. 17 schematically shows gauges 687, 689 displaying a velocity of the glass ribbon 103 at each set of pinch rolls 665, 667. The method further includes severing the glass ribbon 103 along a direction transverse to the travel direction 112. Severing the glass ribbon 103 can be accomplished by any of the methods described above. In one example, the severing operation can be initiated in response to a storage roll reaching a predetermined storage capacity as shown in FIG. 11. Sensors 505 can send a signal to the controller 195 based upon the weight of the first storage roll 501 or the second storage roll 503. Upon receipt of a signal indicating a storage roll 501, 503 is at capacity, the controller 195 can then initiate the severing operation. Additionally, or alternatively, the sensors 505 can send a signal to the controller 195 based upon a length of the glass ribbon 103 that has been wound around the storage roll 501, 503.

Figure 18:
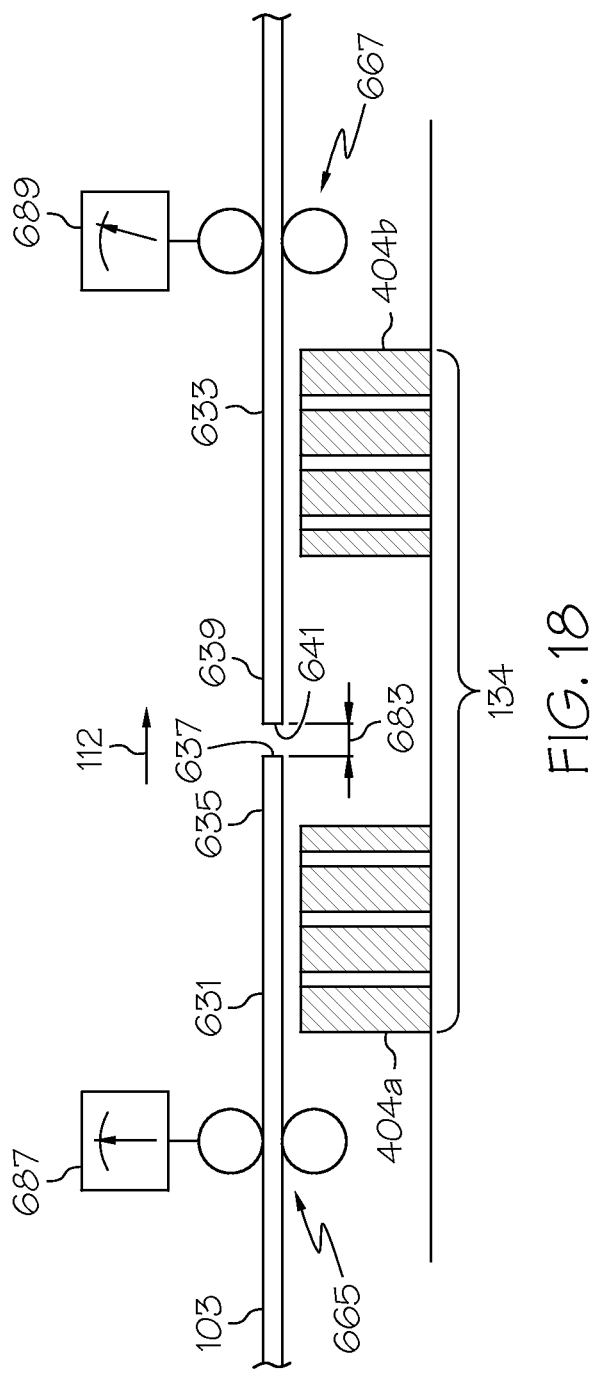
FIG. 18 is similar to FIG. 17 demonstrating the step of increasing the velocity of the downstream edge portion.

This severing operation divides the glass ribbon 103 into two components; the upstream web 631 and the downstream web 633. As is best seen in FIG. 18, the upstream web 631 comprises the upstream edge portion 635 including the upstream severed edge 637. Similarly, the downstream web 633 comprises the downstream edge portion 639 including the downstream severed edge 641. It is often advantageous to develop a glass web separation by forming a gap 683 between the upstream severed edge 637 and the downstream severed edge 641. The gap 683 can facilitate ease of transfer of the upstream web portion to a second storage roll without changing the linear velocity of the glass ribbon in upstream locations of the manufacturing process. The gap can also help eliminate and/or reduce damage that may otherwise result from two severed edges of the glass contacting each other during glass ribbon manufacturing processes. Indeed, the gap can help prevent abutting engagement between the severed edges. The gap can also help prevent one severed edge from riding over (or under) the other edge, thereby possibly creating cracks, breaks and/or other edge or surface imperfections in the glass ribbon. As such, creating the gap can help protect the upstream and downstream edge portions of the glass ribbon without interruption of the glass ribbon process. In one example, the gap can help protect the upstream and downstream edge portions of the glass ribbon in order to allow roll to roll processing of glass ribbon without damage to the glass ribbon and without interrupting the flow of the glass ribbon through various processing locations.

One method of creating the gap 683 can include increasing the relative velocity of the downstream edge portion 639 with respect to the upstream edge portion 635 to create the gap 683 between the downstream severed edge 641 and the upstream severed edge 637. FIG. 18 illustrates a step of increasing the velocity of the downstream edge portion 639 to provide the increased relative velocity of the downstream edge portion 639 with respect to the upstream edge portion 635. A readout on gauge 687 represents the velocity of the upstream web 631 as it is moved through the apparatus 101 with the pinch rolls 665. A readout on gauge 689 shows an increased velocity of the downstream web 633, thereby increasing the relative velocity of the downstream edge portion 639 with respect to the upstream edge portion 635. This difference in relative velocities creates a gap 683 between the downstream severed edge 641 and the upstream severed edge 637. In one example, the velocity of the downstream edge portion 639 can be returned to the velocity of the upstream edge portion 635 at a time when the gap 683 has reached a desired width. This change in velocity of the downstream edge portion 639 can be termed a "jog." Alternatively, the described velocity change controlled by the pinch rolls 665 can be controlled by the speed of one of the storage rolls 501, 503.

Figure 19:
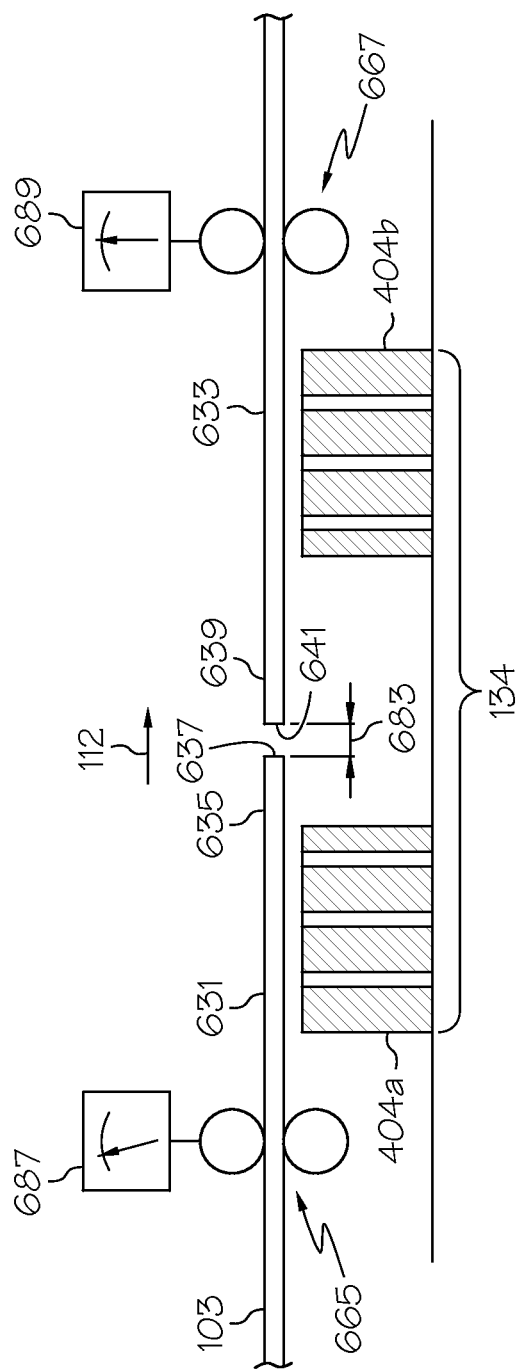
FIG. 19 is similar to FIG. 17 demonstrating the step of decreasing the velocity of the upstream edge portion.

Turning to FIG. 19, another method of increasing the relative velocity of the downstream edge portion 639 with respect to the upstream edge portion 635 to create a gap 683 between the downstream severed edge 641 and the upstream severed edge 637 is shown. This method includes the step of decreasing the velocity of the upstream edge portion 635 to provide the increased relative velocity of the downstream edge portion 639 with respect to the upstream edge portion 635. A readout on gauge 687 represents the velocity of the upstream web 631 as it is moved through the apparatus 101 with the pinch rolls 665. A readout on gauge 687 shows an decreased velocity of the upstream web 631, thereby increasing the relative velocity of the downstream edge portion 639 with respect to the upstream edge portion 635. This difference in relative velocities creates a gap 683 between the downstream severed edge 641 and the upstream severed edge 637. In one example, the velocity of the upstream edge portion 635 can be returned to the velocity of the downstream edge portion 639 at a time when the gap 683 has reached a desired width.

Figure 21:
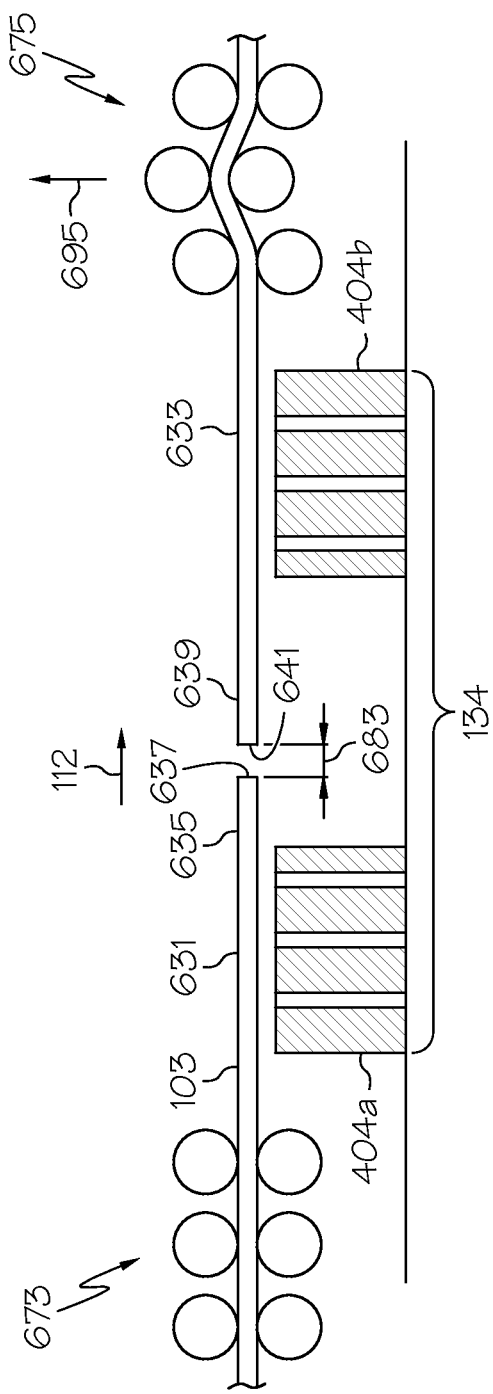
FIG. 21 is similar to FIG. 20 demonstrating the step of collecting an amount of the downstream web in the downstream accumulator.

In further examples of the method, the previously described accumulators 673, 675 may be optionally employed in the step of increasing the relative velocity of the downstream edge portion 639 with respect to the upstream edge portion 635 to create a gap 683 between the downstream severed edge 641 and the upstream severed edge 637. As shown in FIG. 21, a set of guide rollers in the downstream accumulator 675 is moved in the direction of arrow 695 to create a longer travel path for the downstream web 633. As such, an amount of the downstream web 633 is collected by the downstream accumulator 675 to increase the velocity of the downstream edge portion 639. If the speed at which the downstream web 633 is moved through apparatus 101 remains constant, then the longer travel path will tend to increase the velocity of the downstream edge portion 639. The difference in relative velocity between the downstream edge portion 639 with respect to the upstream edge portion 635 creates the gap 683 between the downstream severed edge 641 and the upstream severed edge 637.

Figure 22:
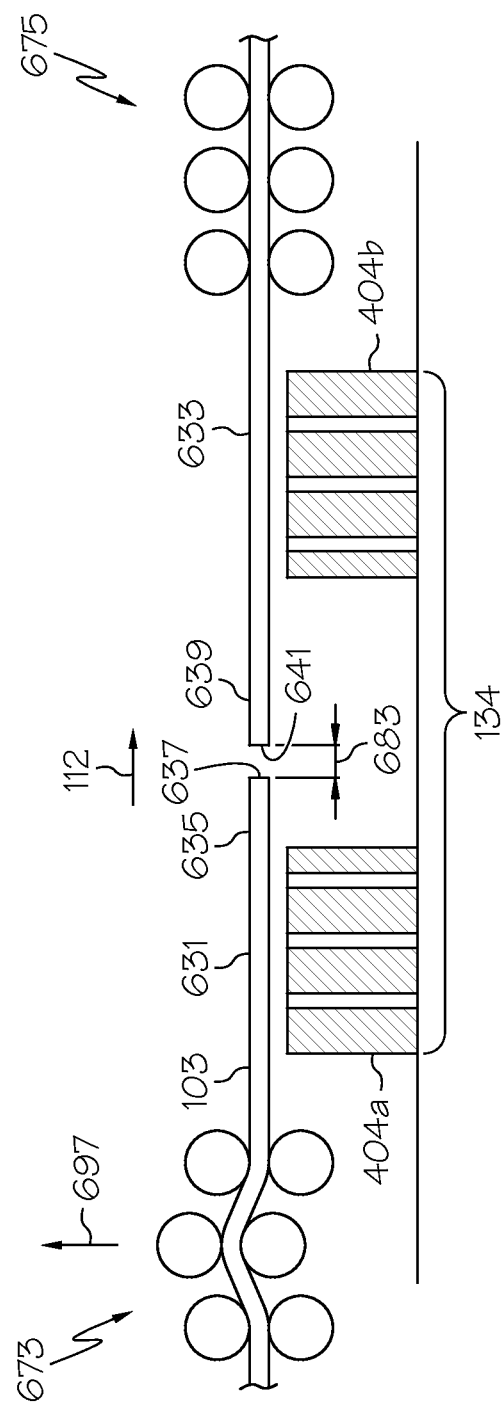
FIG. 22 is similar to FIG. 20 demonstrating the step of collecting an amount of the upstream web in the upstream accumulator.

Similarly, as shown in FIG. 22, a set of guide rollers in the upstream accumulator 673 is moved in the direction of arrow 697 to create a longer travel path for the upstream web 631. As such, an amount of the upstream web 631 is collected by the upstream accumulator 673 to decrease the velocity of the upstream edge portion 635. If the speed at which the upstream web 631 is moved through apparatus 101 remains constant, then the longer travel path will tend to decrease the velocity of the upstream edge portion 635. The difference in relative velocity between the downstream edge portion 639 with respect to the upstream edge portion 635 creates the gap 683 between the downstream severed edge 641 and the upstream severed edge 637.

In another example of the method, the gap 683 between the downstream severed edge 641 and the upstream severed edge 637 can facilitate ease of transfer of glass ribbon 103 flow from a first storage roll 501 to a second storage roll 503 as seen in FIG. 11. As shown, the downstream web 633 is wound on the first storage roll 501. A sensor 509 can detect the gap 683 and communicate the existence of the gap to the controller 195. The controller 195 can then initiate a path change for the upstream web 631. In one example, the upstream web can then be guided toward the second storage roll 503 between a second storage roll support 404c and a first storage roll support 404d. The upstream edge portion 635 of the upstream web 631 is introduced to the second storage roll 503 to begin winding the upstream web 631 on the second storage roll 503. It is to be appreciated that any method of changing the flow of the upstream web 631 to the second storage roll 503 can be used. As the second storage roll 503 reaches capacity, the steps can be repeated to introduce the following severed glass web section to the first storage roll 501.

Returning to FIG. 25, the glass ribbon 103 can include a width 701 extending transverse to the travel path between a first side edge 657 and a second side edge 659. At least one of the first side edge 657 or second side edge 659 includes a handling tab 651, 653. The handling tabs include a mounting portion including an aperture 661 configured to expose the entire respective first side edge 657 or the second side edge 659 within the target area 663. In one example of the method, the step of severing the glass ribbon 103 includes severing the glass ribbon 103 through the at least one of the first side edge 657 or the second side edge 659 within the target area 663.

Figure 23:
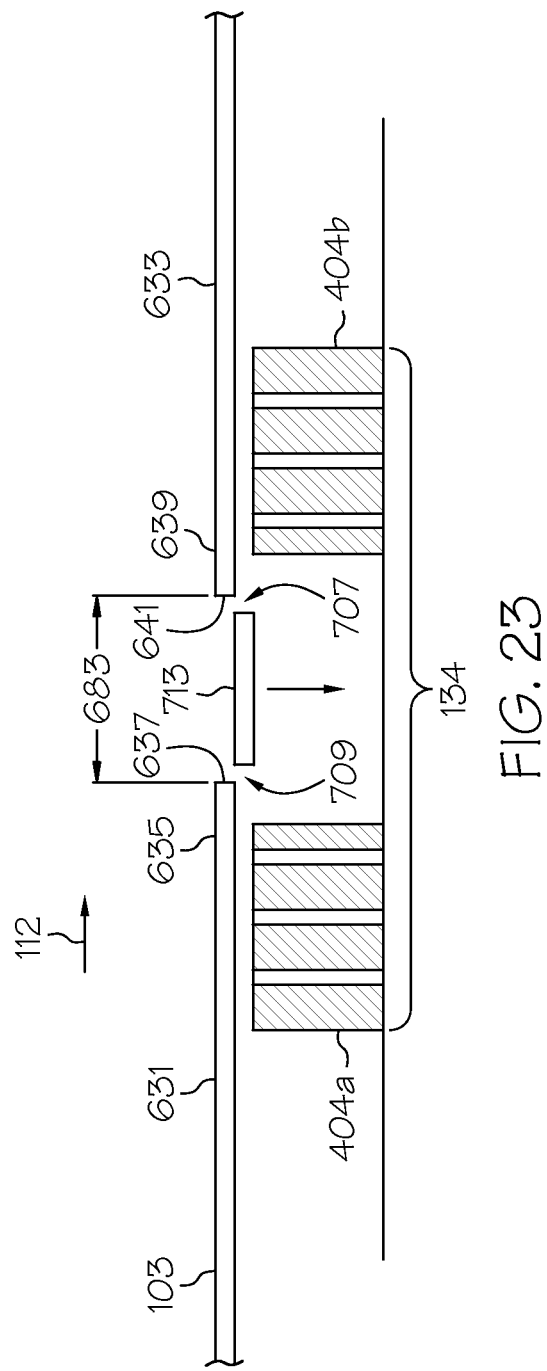
FIG. 23 is a view similar to FIG. 6 demonstrating the step of removing a segment of the glass ribbon.
Figure 24:
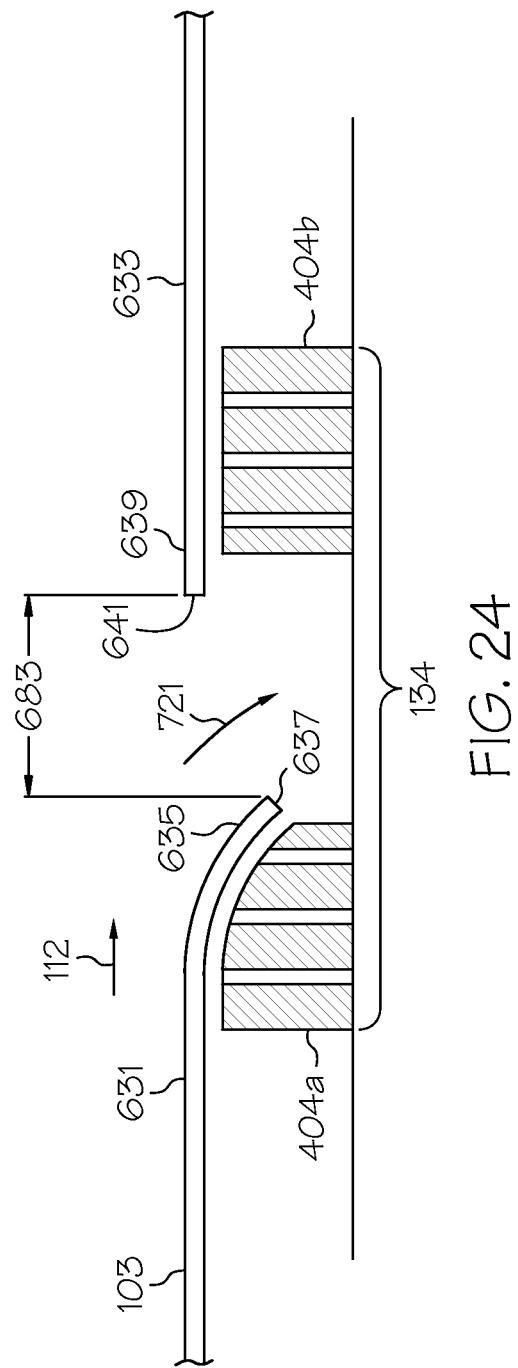
FIG. 24 is a view similar to FIG. 6 demonstrating the step of directing the upstream severed edge along a second travel path.

Another example method of developing a glass web separation between the upstream web 631 and the downstream web 633 is shown in FIG. 23. The method includes severing the glass ribbon 103 at a first location 707 transverse to the travel path as represented by travel direction 112. As an example, the direction transverse to the travel path can be substantially similar to the direction of axis 217 shown in FIG. 3. The method further includes severing the glass ribbon 103 at a second location 709 transverse to the travel path. The first and second severing operations create a segment of glass ribbon 713 that is severed from an upstream web 631 including an upstream severed edge 637 and a downstream web 633 including a downstream severed edge 641. Removing the segment of the glass ribbon 713 creates a gap 683 between the upstream severed edge 637 and the downstream severed edge 641. In one example, the first sever path is substantially parallel to the second sever path.

An example method can also include directing the upstream severed edge 637 along a second travel path 721 to create the gap 683 between the upstream severed edge 637 and the downstream severed edge 641. Introduction of the upstream web 631 to the second travel path 721 can occur within the severing zone 134. The second travel path 721 can lead to the second storage roll 503 (as shown in FIG. 11)

where the upstream web 631 can be introduced to the second storage roll 503 for winding about the second storage roll 503.

The described methods of developing a glass web separation between the upstream web 631 and the downstream web 633 can be beneficial for various processing techniques. In one example, the methods of severing can be useful to allow continuous traversing of the glass ribbon along travel direction 112 or other directions without having to interrupt movement of the glass ribbon. In one example, the methods of severing can be used to allow continuous storage of glass ribbon on storage rolls. For example, the methods of developing a glass web separation can be used during a step of switching between storing a portion of the glass ribbon on a first storage roll and storing another portion of the glass ribbon on a second storage roll.

FIG. 11 illustrates one example of switching between a first storage roll 501 and a second storage roll 503. The method of switching between rolls is illustrated with the severing method including the fluid nozzle 142 with the understanding that the method of switching can also be used with the severing method including the roll mechanism illustrated in FIGS. 12-16. As shown in FIG. 11, a sensor 505, such as the illustrated scale may be used to measure the amount of glass ribbon that has been coiled on the storage roll. The controller 195 can be designed to initiate a severing command once a predetermined amount of glass ribbon has been stored on the roll. Once severed, for example, by one of the techniques discussed above, the controller 195 can alter the path of the glass ribbon 103 from a path leading to the first storage roll 501 to a path leading to the second storage roll 503 that may be loaded with subsequent glass ribbon (e.g. the upstream web 631). As such, the storage rolls 501, 503 can be operated sequentially without interruption of the continuous glass ribbon being processed, or a change in operating speed. It is to be appreciated that FIG. 11 represents a simplified schematic of the storage roll switching process. Additional equipment such as vacuum belts and pinner devices can be included.

In addition or alternatively, the methods of severing can be used to remove an undesirable segment of glass ribbon from the source 105 of glass ribbon 103. For example, the monitoring device 193 may sense an undesired glass ribbon characteristic. In response, the controller 195 can initiate a severing command, wherein the first storage roll 501 may thereafter be removed with high quality glass ribbon stored thereon. Next, a predetermined length of glass ribbon may be traversed through the system for disposal. For instance, as shown, a glass ribbon chopper 507 may receive the predetermined length 103b of glass ribbon having undesired characteristics. Once the monitoring device 193 again senses high quality glass, the controller 195 can again initiate the severing command. After disposing of the predetermined length 103b of glass ribbon, subsequent high quality ribbon can then be stored on the second storage roll 503 (or again on the first storage roll 501 if desired).

It will be apparent to those skilled in the art that various modifications and variations can be made without departing from the spirit and scope of the claimed invention.

What is claimed is:

1. A method of processing a glass ribbon comprising the steps of:
   (I) traversing the glass ribbon through a travel path at a predetermined velocity, the glass ribbon including a width extending transverse to the travel path between a first side edge and a second side edge, wherein at least one of the first or second side edge includes a handling tab with a mounting portion including an aperture configured to expose the entire respective first or second side edge within a target area;
   (II) severing the glass ribbon at a first location transverse to the travel path;
   (III) severing the glass ribbon at a second location transverse to the travel path such that a segment of glass ribbon is severed from an upstream web including an upstream severed edge and a downstream web including a downstream severed edge; and
   (IV) removing the segment of the glass ribbon such that a gap is created between the upstream severed edge and the downstream severed edge.

2. The method of claim 1, wherein a sever path created during step (II) is substantially parallel to a sever path created during step (III).

3. The method of claim 1, further comprising winding the severed downstream web onto a first storage roll.

4. The method of claim 3, wherein step (II) is initiated in response to the first storage roll reaching a predetermined storage capacity.

5. The method of claim 3, wherein the downstream severed edge of the upstream web is introduced to a second storage roll to begin winding the upstream web on the second storage roll.

6. A method of processing a glass ribbon comprising the steps of:
   (I) traversing the glass ribbon through a first travel path at a predetermined velocity and winding the glass ribbon on a first storage roll, wherein the glass ribbon comprises a width extending transverse to the first travel path between a first side edge and a second side edge, wherein at least one of the first side edge or the second side edge includes a handling tab with a mounting portion including an aperture configured to expose the entire respective first side edge or second side edge within a target area;
   (II) severing the glass ribbon along a direction transverse to the first travel path through the at least one of the first side edge or the second side edge within the target area to create an upstream web including a severed edge and a downstream web including a severed edge; and
   (III) directing the severed edge of the upstream web along a second travel path to create a gap between the severed edge of the upstream web and the severed edge of the downstream web and winding the upstream web on a second storage roll.

7. The method of claim 6, wherein step (II) is initiated in response to the first storage roll reaching a predetermined storage capacity.

\* \* \* \* \*